(12) United States Patent
Chen et al.

(10) Patent No.: US 8,069,149 B1
(45) Date of Patent: Nov. 29, 2011

(54) SYSTEM AND METHOD FOR REDIRECTING ACCESS TO A REMOTE MIRRORED SNAPSHOT

(75) Inventors: Raymond C. Chen, Campbell, CA (US); Stephen L. Manley, Pleasanton, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/156,181

(22) Filed: Jun. 8, 2011

Related U.S. Application Data

(60) Continuation of application No. 12/575,587, filed on Oct. 8, 2009, now Pat. No. 7,991,791, which is a continuation of application No. 11/340,228, filed on Jan. 26, 2006, now Pat. No. 7,617,217, which is a division of application No. 10/100,434, filed on Mar. 19, 2002, now Pat. No. 7,010,553.

(51) Int. Cl.
*G06F 17/30* (2006.01)
(52) U.S. Cl. .......................... 707/649; 707/659
(58) Field of Classification Search .................. 707/649, 707/659, 656, 639, 638, 787
See application file for complete search history.

(56) References Cited

U.S. PATENT DOCUMENTS

| | | | |
|---|---|---|---|
| 4,570,217 A | 2/1986 | Allen et al. | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,963,962 A | 10/1999 | Hitz et al. | |
| 5,987,506 A | 11/1999 | Carter et al. | |
| 6,065,037 A | 5/2000 | Hitz et al. | |
| 6,289,356 B1 | 9/2001 | Hitz et al. | |
| 6,425,035 B2 | 7/2002 | Hoese et al. | |
| 6,466,696 B1 | 10/2002 | Politis | |
| 6,574,591 B1 | 6/2003 | Kleiman | |
| 6,604,118 B2 | 8/2003 | Kleiman | |
| 6,643,654 B1 | 11/2003 | Patel | |
| 6,748,504 B2 | 6/2004 | Sawdon et al. | |
| 6,829,617 B2 | 12/2004 | Sawdon et al. | |
| 6,993,539 B2 | 1/2006 | Federwisch et al. | |
| 7,007,046 B2 | 2/2006 | Manley et al. | |
| 7,010,553 B2 | 3/2006 | Chen et al. | |
| 7,039,663 B1 | 5/2006 | Federwisch et al. | |

(Continued)

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

(Continued)

*Primary Examiner* — Diane Mizrahi
(74) *Attorney, Agent, or Firm* — Cesari and McKenna, LLP

(57) ABSTRACT

In a system and method for updating a remote replicated destination file system snapshot with changes in a source file system snapshot, users and processes are redirected to a local exported snapshot of the replicated snapshot on the active file system on the destination before beginning the next update of the active file system's replicated snapshot. In this manner, an unstable replicated snapshot is not accessed. Indirection is introduced into inode lookup at the destination as the destination's active file system is being updated. The indirection can be based upon a snapshot ID that conforms to a latest exported snapshot ID.

20 Claims, 19 Drawing Sheets

U.S. PATENT DOCUMENTS

| | | | |
|---|---|---|---|
| 7,043,485 | B2 | 5/2006 | Manley et al. |
| 7,216,135 | B2 | 5/2007 | Sawdon et al. |
| 7,225,204 | B2 | 5/2007 | Manley et al. |
| 7,249,150 | B1 | 7/2007 | Watanabe et al. |
| 7,386,546 | B1 | 6/2008 | Santry |
| 7,454,445 | B2 | 11/2008 | Lewis |
| 7,590,633 | B1 | 9/2009 | Manley et al. |
| 7,617,217 | B1 | 11/2009 | Chen et al. |
| 7,720,796 | B2 | 5/2010 | Wong et al. |
| 7,765,187 | B2 * | 7/2010 | Bergant et al. ............ 707/614 |
| 7,865,479 | B2 | 1/2011 | Gu et al. |
| 7,873,700 | B2 | 1/2011 | Pawlowski et al. |
| 2002/0078041 | A1 | 6/2002 | Wu |
| 2003/0182312 | A1 | 9/2003 | Chen et al. |
| 2004/0078419 | A1 | 4/2004 | Ferrari et al. |
| 2005/0033748 | A1 | 2/2005 | Kazar et al. |
| 2007/0162512 | A1 | 7/2007 | Kollar et al. |
| 2009/0276596 | A1 | 11/2009 | Yadav et al. |
| 2011/0191295 | A1 * | 8/2011 | Ozdemir et al. ............ 707/639 |

OTHER PUBLICATIONS

Bitton, Dina, *Disk Shadowing*, Proceedings of the 14th VLDB Conference, LA, CA 1988.
Chaudhuri, Surajit, et al., *Self-Tuning Technology in Microsoft SQL Server*, Data Engineering Journal 22, 2 1999 pp. 20-27.
Chutani, Sailesh, et al., *The Episode File System*, In Proceedings of the USENIX Winter 1992.
Coyne, Robert A., et al., *Storage Systems for National Information Assets*, Proc. Supercomputing 92, Minneapolis, Nov. 1992, pp. 626-633.
Finlayson, Ross S., et al., *Log Files: An Extended File Service Exploiting Write-Once Storage* Department of Computer Science, Stanford University, Report No. STAN-CS-87-1177, Sep. 1987.
Gray, Jim, et al., *The Recovery Manager of the System R Database Manager*, ACM Computing Surveys, (13)2:223-242 1981.
Hecht, Matthew S., et al. *Shadowed Management of Free Disk Pages with a Linked List*, ACM Transactions on Database Systems, 8/4, Dec. 1983, pp. 503-514.
Howard, John, H. et al., *Scale and Performance in a Distributed File System*, Carnegie Mellon University, CMU-ITC-87-068, Aug. 1987.
Howard, John H., *An Overview of the Andrew File System*, Carnegie Mellon University, CMU-ITC-88-062 1988.
Howard, John, H. et al., *Scale and Performance in a Distributed File System*, ACM Trans. Computer System, 6(1), Feb. 1988 pp. 51-81.
Kazar, Michael L., et al., *DEcorum File System Architectural Overview*, USENIX Summer Conference, Anaheim, California, 1990.
Kemper, Alfons, et al., *Performance Tuning for SAP R/3*, Data Engineering Journal 22, 2 1999 pp. 33-40.
Kent, Jack et al., *Optimizing Shadow Recovery Algorithms*, IEEE Transactions on Software Engineering, 14(2): 155-168 , Feb. 1988.
Kistler, et al., *Disconnected Operation in the Coda File System*, ACM Transactions on Computer Systems, vol. 10, No. 1, Feb. 1992, pp. 3-25.
Lorie, Raymond, A. *Physical Integrity in a Large Segmented Database*, ACM Trans. Database Syst., vol. 2, Mar. 1977, pp. 91-104.
Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.
Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.
Quinlan, Sean, *A Cached WORM File System*, Software-Practice and Experience, 21(12):1289-1299 1991.
Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.
Rosenblum, Mendel, et al. *The Design and Implementation of a Log-Structured File System* Jul. 24, 1991 pp. 1-15.
Rosenblum, Mendel, *The Design and Implementation of a Log-Structured File System*, 1992 pp. 1-93.
Rosenblum, Mendel, et al., *The Design and Implementation of a Log-Structured File System*, In Proceedings of ACM Transactions on Computer Systems, (10)1:26-52, Feb. 1992.
Schiefer, Berni, et al., *DB2 Universal Database Performance Tuning*, Data Engineering Journal 22, 2 1999 pp. 12-19.
Seltzer, Margo I., et al., *Journaling Versus Soft Updates: Asynchronous Meta-Data Protection in File Systems*, Proceedings of 200 USENIX Annual Technical Conference, Jun. 18-23, 2000.
Shasha, Dennis, *Tuning Time Series Queries in Finance: Case Studies and Recommendations*, Data Engineering Journal 22, 2 1999 pp. 41-47.
Sidebotham, Bob, *Volumes: The Andrew File System Data Structuring Primitive*, EEUG Conference Proceedings, Manchester, UK, Autumn 1986.
Subramanian, Muralidhar, et al., *Performance Challenges in Object-Relational DBMSs*, Data Engineering Journal 22, 2 1999 pp. 28-32.
Weikum, Gerhard, et al., *Towards Self-Tuning Memory Management for Data Servers*, Data Engineering Journal 22, 2 1999 pp. 3-11.
West, Michael, et al. *The ITC Distributed File System: Prototype and Experience*, Carnegie-Mellon University, Technical Report CMU-ITC-040, Mar. 1985.
Zayas, Edward R., AFS-3 Programmer's Reference: Architectural Overview, Transarc Corporation, Pittsburgh, PA, 1.0 edition 1991.
Hitz, David et al., TR3002 File System Design for an NFS File Server Appliance, 1-10, Network Appliance, Inc, Sunnyvale, CA, USA, Mar. 1995.
Kazar< Michael Leon, Synchronization and Caching Issues in the Andrew File System, Carnegie Mellon University, CMU-ITC-88-063, Jun. 1987.
U.S. Appl. No. 11/340,228, entitled System and Method for Redirecting Access to a Remote Mirrored Snapshot, filed Jan. 26, 2006 by Raymond C. Chen.

* cited by examiner

BASE SNAPSHOT

| INODE # | GENERATION # | QTREE ID # | OTHER METADATA |
|---|---|---|---|
| 2800 | — | — | UNALLOCATED |
| 2801 | 1 | Q2 | ... |
| 2802 | 1 | Q2 | ... |
| 2803 | 1 | Q3 | ... |

↙ 810
BLOCK 10

INCREMENTAL SNAPSHOT

| INODE # | GENERATION # | QTREE ID # | OTHER METADATA |
|---|---|---|---|
| 2800 | 1 | Q2 | ... |
| 2801 | 1 | Q2 | ... |
| 2802 | — | — | UNALLOCATED |
| 2803 | 2 | Q2 | ... |

↙ 182
BLOCK 12

FIG. 8B

|  | | | |
|---|---|---|---|
| SOURCE INODE | INODE 877 | INODE 878 | ... |
| DESTINATION INODE | INODE 9912 | INODE 10100 | ... |
| SOURCE GENERATION # | 3 | 2 | ... |
| DESTINATION GENERATION # | 3 | 3 | ... |

SYSTEM AND METHOD FOR REDIRECTING ACCESS TO A REMOTE MIRRORED SNAPSHOT

RELATED APPLICATIONS

This application is a Continuation of U.S. patent application Serial No. 12/575,587, filed on Oct. 8, 2009, entitled SYSTEM AND METHOD FOR REDIRECTING ACCESS TO A REMOTE MIRRORED SNAPSHOT, by Chen, et al., which is a Continuation of U.S. patent application Ser. No. 11/340,228, filed on Jan. 26, 2006, now issued as U.S. Pat. No. 7,617,217 on Nov. 10, 2009, which is a Divisional of U.S. patent application Ser. No. 10/100,434, filed on Mar. 19, 2002, now issued as U.S. Pat. No. 7,010,553 on Mar. 7, 2006, entitled System and Method for Redirecting Access to a Remote Mirrored Snapshot, by Raymond C. Chen et al., the teachings of which are expressly incorporated herein by reference;

This application is related to the following United States Patent Applications:

Ser. No. 10/100,950, now issued as U.S. Pat. No. 7,225,204, entitled SYSTEM AND METHOD FOR ASYNCHRONOUS MIRRORING OF SNAPSHOTS AT A DESTINATION USING A PURGATORY DIRECTORY AND INODE MAPPING, by Stephen L. Manley, et al., the teachings of which are expressly incorporated herein by reference;

Ser. No. 10/100,945, now issued as U.S. Pat. No. 7,043,485, entitled SYSTEM AND METHOD FOR STORAGE OF SNAPSHOT METADATA IN A REMOTE FILE, by Stephen L. Manley, et al., the teachings of which are expressly incorporated herein by reference;

Ser. No. 10/100,879, now issued as U.S. Pat. No. 7,007,046, entitled FORMAT FOR TRANSMISSION OF FILE SYSTEM INFORMATION BETWEEN A SOURCE AND A DESTINATION, by Stephen L. Manley, et al., the teachings of which are expressly incorporated herein by reference;

Ser. No. 10/100,967, now issued as U.S. Pat. No. 6,993,539, entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., the teachings of which are expressly incorporated herein by reference; and Ser. No. 10/126,822, now issued as U.S. Pat. No. 7,039,663, entitled SYSTEM AND METHOD FOR CHECKPOINTING AND RESTARTING AN ASYNCHRONOUS TRANSFER OF DATA BETWEEN A SOURCE AND DESTINATION SNAPSHOT, by Michael L. Federwisch, et al., the teachings of which are expressly incorporated herein by reference.

FIELD OF THE INVENTION

This invention relates to storage of data using file servers and more particularly to mirroring or replication of stored data in remote storage locations over a network.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a direct connection or computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. By "file system" it is meant generally a structuring of data and metadata on a storage device, such as disks, which permits reading/writing of data on those disks. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ software, residing on the filer, that processes file-service requests from network-attached clients.

As used herein, the term "storage operating system" generally refers to the computer-executable code operable on a computer that manages data access and may, in the case of a filer, implement file system semantics, such as the Data ONTAP™ storage operating system, implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

In order to improve reliability and facilitate disaster recovery in the event of a failure of a filer, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or its infrastructure (e.g. a flood, power outage, act of war, etc.). The mirror is updated at regular intervals, typically set by an administrator, in an effort to catch the most recent changes to the file system. One common form of update involves the use of a "snapshot" process in which the active file system at the storage site, consisting of inodes and blocks, is captured and the "snapshot" is transmitted as a whole, over a network (such as the well-known Internet) to the remote storage site. Generally, a snapshot is an image (typically read-only) of a file system at a point in time, which is stored on the same primary storage device as is the active file system and is accessible by users of the active file system. By "active file system" it is meant the file system to which current input/output operations are being directed. The primary storage device, e.g., a set of disks, stores the active file system, while a secondary storage, e.g. a tape drive, may be utilized to store backups of the active file system. Once snapshotted, the active file system is reestablished, leaving the snapshotted version in place for possible disaster recovery. Each time a snapshot occurs, the old active file system becomes the new snapshot, and the new active file system carries on, recording any new changes. A set number of snapshots may be retained depending upon various time-based and other criteria. The snapshotting process is described in further detail in U.S. Pat. No. 7,454,445 on Nov. 18, 2008, entitled INSTANT SNAPSHOT by Blake Lewis et al., which is hereby incorporated by reference as though fully set forth herein. In addition, the native Snapshot™ capabilities of the WAFL file system are further described in *TR3002 File System Design for an NFS File Server Appliance* by David Hitz et al., published by Network Appliance, Inc., and in commonly owned U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference.

The complete recopying of the entire file system to a remote (destination) site over a network may be quite inconvenient where the size of the file system is measured in tens or hundreds of gigabytes (even terabytes). This full-backup approach to remote data replication may severely tax the bandwidth of the network and also the processing capabilities of both the destination and source filer. One solution has been to limit the snapshot to only portions of a file system volume that have experienced changes. Hence, FIG. 1 shows a prior art volume-based mirroring where a source file system 100 is connected to a destination storage site 102 (consisting of a server and attached storage—not shown) via a network link 104. The destination 102 receives periodic snapshot updates at some regular interval set by an administrator. These intervals are chosen based upon a variety of criteria including available bandwidth, importance of the data, frequency of changes and overall volume size.

In brief summary, the source creates a pair of time-separated snapshots of the volume. These can be created as part of the commit process in which data is committed to non-volatile memory in the filer or by another mechanism. The "new" snapshot 110 is a recent snapshot of the volume's active file system. The "old" snapshot 112 is an older snapshot of the volume, which should match the image of the file system replicated on the destination mirror. Note, that the file server is free to continue work on new file service requests once the new snapshot 112 is made. The new snapshot acts as a checkpoint of activity up to that time rather than an absolute representation of the then-current volume state. A differencer 120 scans the blocks 122 in the old and new snapshots. In particular, the differencer works in a block-by-block fashion, examining the list of blocks in each snapshot to compare which blocks have been allocated. In the case of a write-anywhere system, the block is not reused as long as a snapshot references it, thus a change in data is written to a new block. Where a change is identified (denoted by a presence or absence of an 'X' designating data), a decision process 200, shown in FIG. 2, in the differencer 120 decides whether to transmit the data to the destination 102. The process 200 compares the old and new blocks as follows: (a) Where data is in neither an old nor new block (case 202) as in old/new block pair 130, no data is available to transfer (b) Where data is in the old block, but not the new (case 204) as in old/new block pair 132, such data has already been transferred, (and any new destination snapshot pointers will ignore it), so the new block state is not transmitted. (c) Where data is present in the both the old block and the new block (case 206) as in the old/new block pair 134, no change has occurred and the block data has already been transferred in a previous snapshot. (d) Finally, where the data is not in the old block, but is in the new block (case 208) as in old/new block pair 136, then a changed data block is transferred over the network to become part of the changed volume snapshot set 140 at the destination as a changed block 142. In the exemplary write-anywhere arrangement, the changed blocks are written to new, unused locations in the storage array. Once all changed blocks are written, a base file system information block, that is the root pointer of the new snapshot, is then committed to the destination. The transmitted file system information block is committed, and updates the overall destination file system by pointing to the changed block structure in the destination, and replacing the previous file system information block. The changes are at this point committed as the latest incremental update of the destination volume snapshot. This file system accurately represents the "new" snapshot on the source. In time a new "new" snapshot is created from further incremental changes.

Approaches to volume-based remote mirroring of snapshots are described in detail in commonly owned U.S. Pat. No. 6,604,118, issued on Aug. 5, 2003, entitled FILE SYSTEM IMAGE TRANSFER by Steven Kleiman, et al. and U.S. Pat. No. 6,574,591, issued on Jun. 3, 2003, entitled FILE SYSTEM IMAGE TRANSFER BETWEEN DISSIMILAR FILE SYSTEMS by Steven Kleiman, et al., both of which patents are expressly incorporated herein by reference.

This volume-based approach to incremental mirroring from a source to a remote storage destination is effective, but may still be inefficient and time-consuming as it forces an entire volume to be scanned for changes and those changes to be transmitted on a block-by-block basis. In other words, the scan focuses on blocks without regard to any underlying information about the files, inodes and data structures, which the blocks comprise. The destination is organized as a set of volumes so a direct volume-by-volume mapping is established between source and destination. Again, where a volume may contain a terabyte or more of information, the block-by-block approach to scanning and comparing changes may still involve significant processor overhead and associated processing time. Often, there may have been only minor changes in a sub-block beneath the root inode block being scanned. Since a list of all blocks in the volume is being examined, however, the fact that many groupings of blocks (files, inode structures, etc.) are unchanged is not considered. In addition, the increasingly large size and scope of a full volume make it highly desirable to sub-divide the data being mirrored into sub-groups, because some groups are more likely to undergo frequent changes, it may be desirable to update their replicas more often than other, less-frequently changed groups. In addition, it may be desirable to mingle original and replicated (snapshotted) sub-groups in a single volume and migrate certain key data to remote locations without migrating an entire volume. Accordingly, a more sophisticated approach to scanning and identifying changed blocks may be desirable, as well as a sub-organization for the volume that allows for the mirroring of less-than-an-entire volume.

One such sub-organization of a volume is the well-known qtree. Qtrees, as implemented on an exemplary storage system such as described herein, are subtrees in a volume's file system. One key feature of qtrees is that, given a particular qtree, any file or directory in the system can be quickly tested for membership in that qtree, so they serve as a good way to organize the file system into discrete data sets. The use of qtrees as a source and destination for snapshotted data is desirable.

Where a destination snapshot is updated by a source snapshot, the destination snapshot, which resides on the active file system accessible by users and processes, will remain unstable for a period of time. In other words, if a user or process attempts to read from or write to the snapshot, it would obtain an incomplete picture of the data and directory structure (a destination qtree structure, for example), possible containing incomplete or corrupted branches. It is desirable for this, and other reasons to restrict access to a snapshot while it is being updated.

SUMMARY OF THE INVENTION

This invention overcomes the disadvantages of the prior art, in a system and method for updating a replicated destination file system snapshot with changes in a source file system snapshot, by redirecting users and processes to a local snapshot of the replicated snapshot on the active file system on the destination before beginning the next update of the active file system's replicated snapshot. In this manner, an unstable replicated snapshot is not accessed.

More particularly, in an illustrative embodiment, an indirection is introduced into a file system inode lookup process on the destination so that the active file system, representing the mirrored snapshot of the source qtree (or other volume sub-organization), is made inaccessible to clients and processes in favor of a latest exported snapshot taken at the completion of a directly preceding update of the mirror snapshot by the source. In particular, access is redirected to the snapshot by setting the snapshot ID for the file handle of the inode (i.e. the data set used by the file system to access the inode) to a "magic ID" that causes the file system to look up the inode in the active file system, determine the owning qtree and, after consulting a qtree metadata file, extract the latest exported snapshot ID. An inode lookup from this snapshot is then performed, and the inode is returned. The client or process never sees the updating (unstable) active file system qtree, and when the next update is complete, a new latest snapshot is exported and the older exported snapshot can be eventually deleted. The ID of the new latest exported snapshot is correspondingly written to the qtree metadata file.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 8B is a more detailed schematic diagram of an exemplary base snapshot and incremental snapshot block illustrating the inode picker process of FIG. 8A;

DETAILED DESCRIPTION OF AN ILLUSTRATIVE EMBODIMENT

A. Network and File Server Environment

Figure 1:
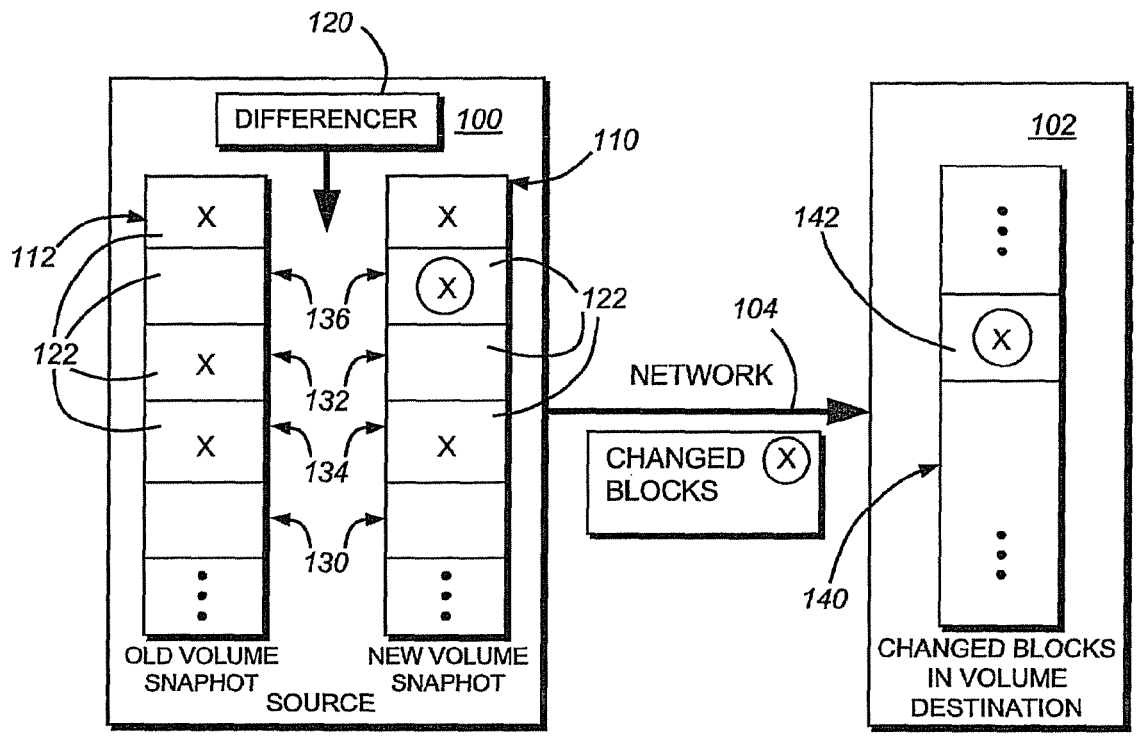
FIG. 1, already described, is a schematic block diagram of an exemplary remote mirroring of a volume snapshot from a source file server to a destination file server over a network according to a prior implementation.
Figure 2:
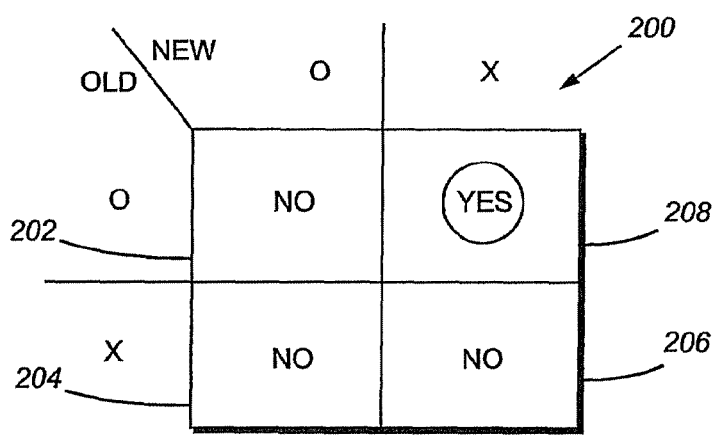
FIG. 2, already described, is a decision table used by a block differencer of FIG. 1 for determining whether a change in a block is to be transmitted from the source file server to the destination file server according to a prior implementation.
Figure 3:
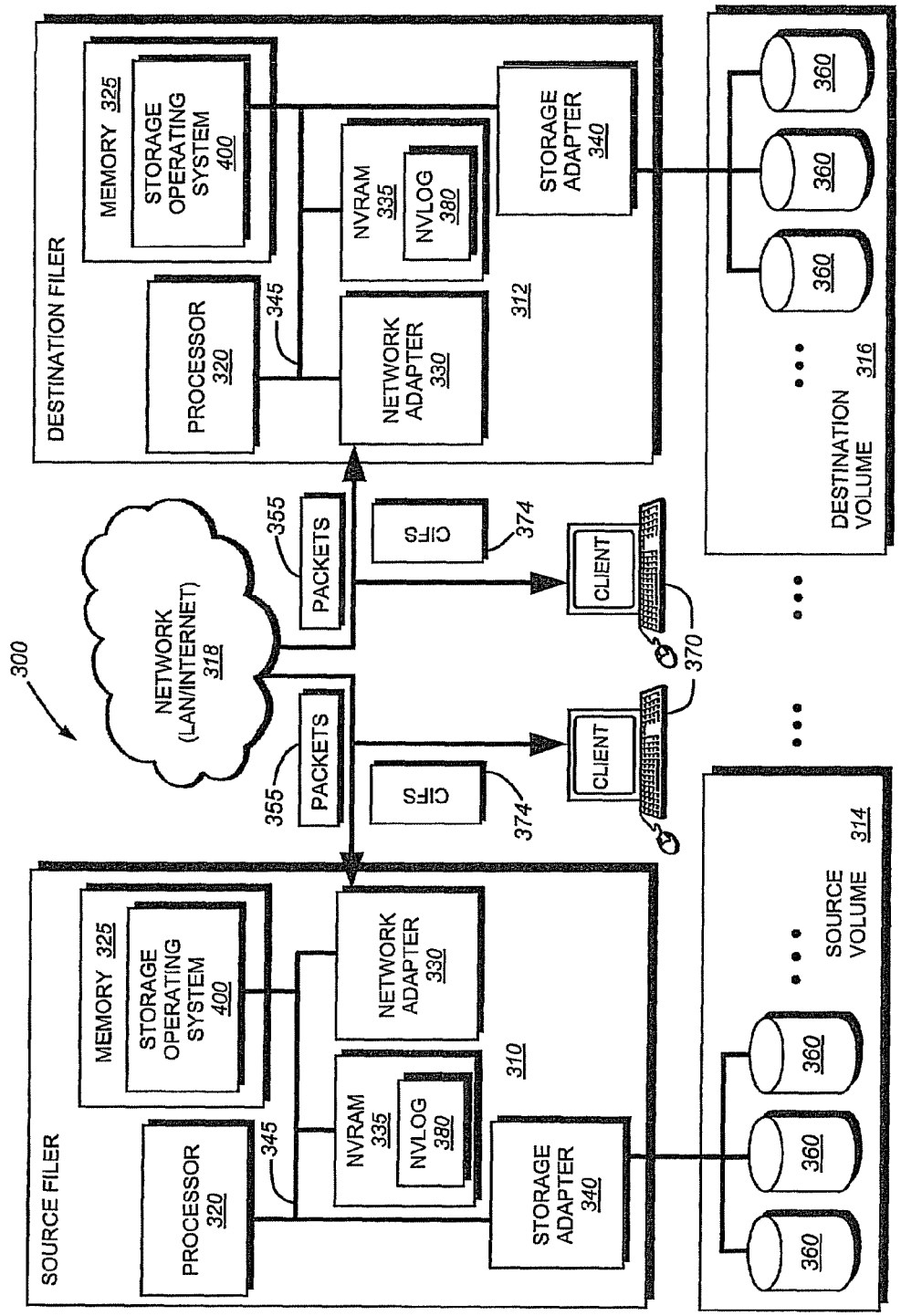
FIG. 3 is a schematic block diagram defining an exemplary network and file server environment including a source file server and a destination file server within which the principles of this invention are implemented.

By way of further background, FIG. 3 is a schematic block diagram of a storage system environment 300 that includes a pair of interconnected file servers including a source file server 310 and a destination file server 312 that may each be advantageously used with the present invention. For the purposes of this description, the source file server is a networked computer that manages storage one or more source volumes 314, each having an array of storage disks 360 (described further below). Likewise, the destination filer 312 manages one or more destination volumes 316, also comprising arrays of disks 360. The source and destination file servers or "filers" are linked via a network 318 that can comprise a local or wide area network, such as the well-known Internet. An appropriate network adapter 330 residing in each filer 310, 312 facilitates communication over the network 318. Also for the purposes of this description, like components in each of the source and destination filer, 310 and 312 respectively, are described with like reference numerals. As used herein, the term "source" can be broadly defined as a location from which the subject data of this invention travels and the term "destination" can be defined as the location to which the data travels. While a source filer and a destination filer, connected by a network, is a particular example of a source and destination used herein, a source and destination could be computers/filers linked via a direct link, or via loopback (a "networking" arrangement internal to a single computer for transmitting a data stream between local source and local destination), in which case the source and the destination are the same filer. As will be described further below, the source and destination are broadly considered to be a source sub-organization of a volume and a destination sub-organization of a volume. Indeed, in at least one special case the source and destination sub-organizations can be the same at different points in time.

In the particular example of a pair of networked source and destination filers, each filer 310 and 312 can be any type of special-purpose computer (e.g., server) or general-purpose computer, including a standalone computer. The source and destination filers 310, 312 each comprise a processor 320, a memory 325, a network adapter 330 and a storage adapter 340 interconnected by a system bus 345. Each filer 310, 312 also includes a storage operating system 400 (FIG. 4) that implements a file system to logically organize the information as a hierarchical structure of directories and files on the disks.

It will be understood to those skilled in the art that the inventive technique described herein may apply to any type of special-purpose computer (e.g., file serving appliance) or general-purpose computer, including a standalone computer, embodied as a storage system. To that end, the filers 310 and 312 can each be broadly, and alternatively, referred to as storage systems. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 325 comprises storage locations that are addressable by the processor and adapters for storing software program code. The memory comprises a form of random access memory (RAM) that is generally cleared by a power cycle or other reboot operation (i.e., it is "volatile" memory). The processor and adapters may, in turn, comprise processing elements and/or logic circuitry configured to execute the software code and manipulate the data structures. The operating system 400, portions of which are typically resident in memory and executed by the processing elements, functionally organizes the filer by, inter alia, invoking storage operations in support of a file service implemented by the filer. It will be apparent to those skilled in the art that other processing and memory means, including various computer-readable media, may be used for storing and executing program instructions pertaining to the inventive technique described herein.

The network adapter 330 comprises the mechanical, electrical and signaling circuitry needed to connect each filer 310, 312 to the network 318, which may comprise a point-to-point connection or a shared medium, such as a local area network. Moreover the source filer 310 may interact with the destination filer 312 in accordance with a client/server model of information delivery. That is, the client may request the services of the filer, and the filer may return the results of the services requested by the client, by exchanging packets 355 encapsulating, e.g., the TCP/IP protocol or another network protocol format over the network 318.

The storage adapter 340 cooperates with the operating system 400 (FIG. 4) executing on the filer to access information requested by the client. The information may be stored on the disks 360 that are attached, via the storage adapter 340 to each filer 310, 312 or other node of a storage system as defined herein. The storage adapter 340 includes input/output (I/O) interface circuitry that couples to the disks over an I/O inter-connect arrangement, such as a conventional high-performance, Fibre Channel serial link topology. The information is retrieved by the storage adapter and processed by the processor 320 as part of the snapshot procedure, to be described below, prior to being forwarded over the system bus 345 to the network adapter 330, where the information is formatted into a packet and transmitted to the destination server as also described in detail below.

Each filer may also be interconnected with one or more clients 370 via the network adapter 330. The clients transmit requests for file service to the source and destination filers 310, 312, respectively, and receive responses to the requests over a LAN or other network (318). Data is transferred between the client and the respective filer 310, 312 using data packets 374 defined as an encapsulation of the Common Internet File System (CIFS) protocol or another appropriate protocol such as NFS.

In one exemplary filer implementation, each filer 310, 312 can include a non-volatile random access memory (NVRAM) 335 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

In an illustrative embodiment, the disks 360 are arranged into a plurality of volumes (for example, source volumes 314 and destination volumes 316), in which each volume has a file system associated therewith. The volumes each include one or more disks 360. In one embodiment, the physical disks 360 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

B. Storage Operating System

To facilitate generalized access to the disks 360, the storage operating system 400 (FIG. 4) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which references to other files and directories are stored. As noted and defined above, in the illustrative embodiment described herein, the storage operating system is the NetApp® Data ONTAP™ operating system available from Network Appliance, Inc., of Sunnyvale, Calif. that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Figure 4:
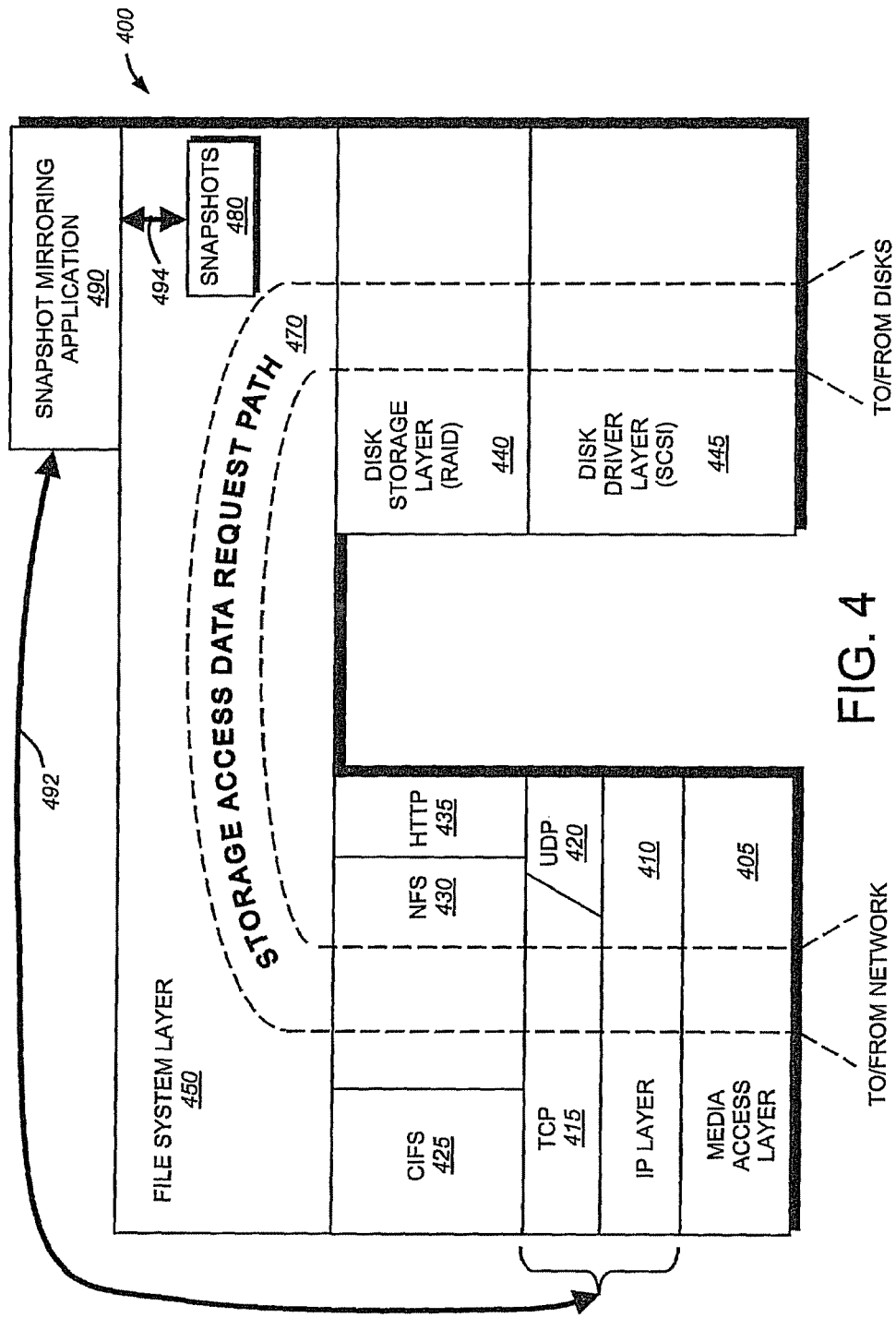
FIG. 4 is a schematic block diagram of an exemplary storage operating system for use with the file servers of FIG. 3.

The organization of the preferred storage operating system for each of the exemplary filers is now described briefly. However, it is expressly contemplated that the principles of this invention can be implemented using a variety of alternate storage operating system architectures. In addition, the particular functions implemented on each of the source and destination filers 310, 312 may vary. As shown in FIG. 4, the exemplary storage operating system 400 comprises a series of software layers, including a media access layer 405 of network drivers (e.g., an Ethernet driver). The operating system further includes network protocol layers, such as the Internet Protocol (IP) layer 410 and its supporting transport mechanisms, the Transport Control Protocol (TCP) layer 415 and the User Datagram Protocol (UDP) layer 420. A file system protocol layer provides multi-protocol data access and, to that end, includes support for the CIFS protocol 425, the NFS protocol 430 and the Hypertext Transfer Protocol (HTTP) protocol 435. In addition, the storage operating system 400 includes a disk storage layer 440 that implements a disk storage protocol, such as a RAID protocol, and a disk driver layer 445, that implements a disk control protocol such as the small computer system interface (SCSI).

Bridging the disk software layers with the network and file system protocol layers is a file system layer 450 of the storage operating system 400. Generally, the layer 450 implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the filer's memory 325. If the information is not in memory, the file system layer 450 indexes into the inode file using the inode number to access an appropriate entry and retrieve a volume block number. The file system layer 450 then passes the volume block number to the disk storage (RAID) layer 440, which maps that volume block number to a disk block number and sends the latter to an appropriate driver (for example, an encapsulation of SCSI implemented on a fibre channel disk interconnection) of the disk driver layer 445. The disk driver accesses the disk block number from volumes and loads the requested data in memory 325 for processing by the filer 310, 312. Upon completion of the request, the filer (and storage operating system) returns a reply, e.g., a conventional acknowledgement packet 374 defined by the CIFS specification, to the client 370 over the respective network connection 372.

It should be noted that the software "path" 470 through the storage operating system layers described above needed to perform data storage access for the client request received at the filer may alternatively be implemented in hardware or a combination of hardware and software. That is, in an alternate embodiment of the invention, the storage access request data path 470 may be implemented as logic circuitry embodied within a field programmable gate array (FPGA) or an application specific integrated circuit (ASIC). This type of hardware implementation increases the performance of the file service provided by filer 310, 312 in response to a file system request packet 374 issued by the client 370.

Overlying the file system layer 450 is the snapshot mirroring (or replication) application 490 in accordance with an illustrative embodiment of this invention. This application, as described in detail below, is responsible (on the source side) for the scanning and transmission of changes in the snapshot from the source filer 310 to the destination filer 312 over the network. This application is responsible (on the destination side) for the generation of the updated mirror snapshot from received information. Hence, the particular function of the source and destination applications are different, and are described as such below. The snapshot mirroring application 490 operates outside of the normal request path 470 as shown by the direct links 492 and 494 to the TCP/IP layers 415, 410 and the file system snapshot mechanism (480). Notably, the application interacts with the file system layer to gain knowledge of files so it is able to use a file-based data structure (inode files, in particular) to replicate source snapshots at the destination.

C. Snapshot Procedures

The inherent Snapshot™ capabilities of the exemplary WAFL file system are further described in *TR3002 File System Design for an NFS File Server Appliance* by David Hitz et al., published by Network Appliance, Inc., which is hereby incorporated by reference. Note, "Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other unique identifiers that distinguishes it from other PCPIs taken at other points in time. A PCPI can also include other information (metadata) about the active file system at the particular point in time for which the image is taken. The terms "PCPI" and "snapshot" shall be used interchangeably through out this patent without derogation of Network Appliance's trademark rights.

Snapshots are generally created on some regular schedule. This schedule is subject to great variation. In addition, the number of snapshots retained by the filer is highly variable. Under one storage scheme, a number of recent snapshots are stored in succession (for example, a few days worth of snapshots each taken at four-hour intervals), and a number of older snapshots are retained at increasing time spacings (for example, a number of daily snapshots for the previous week (s) and weekly snapshot for the previous few months). The snapshot is stored on-disk along with the active file system, and is called into the buffer cache of the filer memory as requested by the storage operating system 400 or snapshot mirror application 490 as described further below. However, it is contemplated that a variety of snapshot creation techniques and timing schemes can be implemented within the teachings of this invention.

Figure 5:
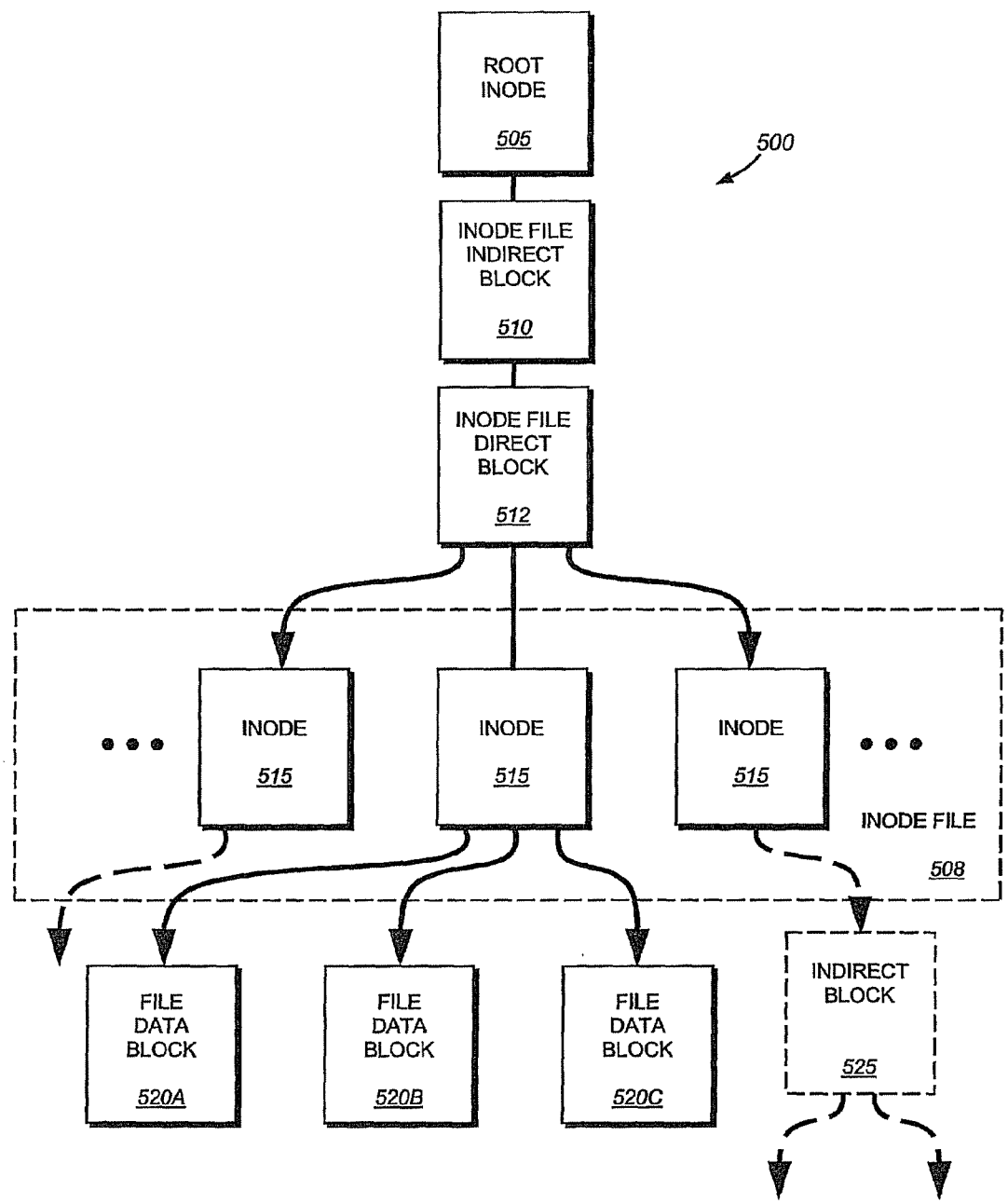
FIG. 5 is schematic block diagram of an exemplary file system inode structure.

An exemplary file system inode structure 500 according to an illustrative embodiment is shown in FIG. 5. The inode for the inode file or more generally, the "root" inode 505 contains information describing the inode file 508 associated with a given file system. In this exemplary file system inode structure root inode 505 contains a pointer to the inode file indirect block 510. The inode file indirect block 510 points to one or more inode file direct blocks 512, each containing a set of pointers to inodes 515 that make up the inode file 508. The depicted subject inode file 508 is organized into volume blocks (not separately shown) made up of inodes 515 which, in turn, contain pointers to file data (or "disk") blocks 520A, 520B and 520C. In the diagram, this is simplified to show just the inode itself containing pointers to the file data blocks. Each of the file data blocks 520(A-C) is adapted to store, in the illustrative embodiment, 4 kilobytes (KB) of data. Note, however, where more than a predetermined number of file data blocks are referenced by an inode (515) one or more indirect blocks 525 (shown in phantom) are used. These indirect blocks point to associated file data blocks (not shown). If an inode (515) points to an indirect block, it cannot also point to a file data block, and vice versa.

Figure 6:
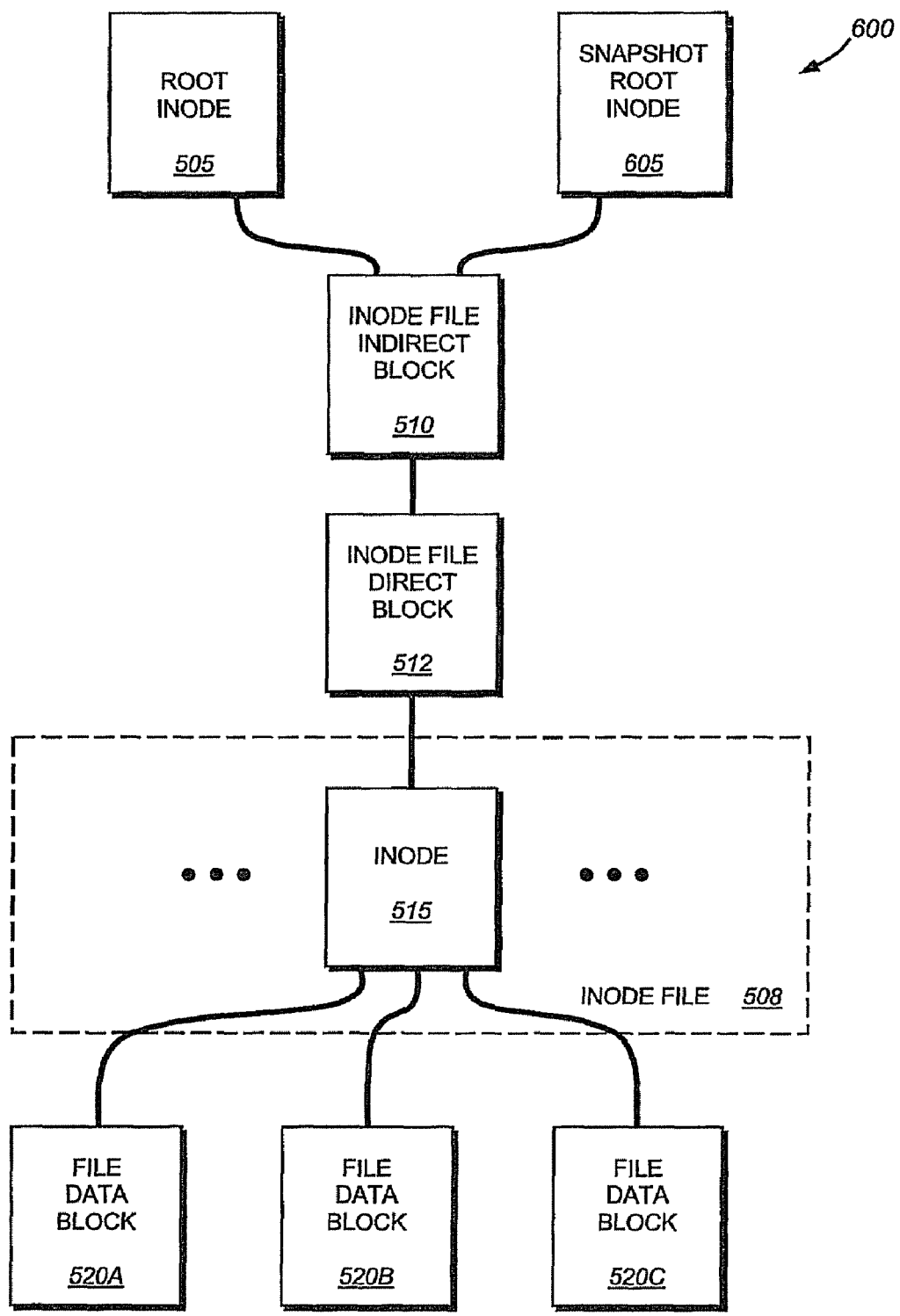
FIG. 6 is a schematic block diagram of the exemplary file system inode structure of FIG. 5 including a snapshot inode.

When the file system generates a snapshot of a given file system, a snapshot inode is generated as shown in FIG. 6. The snapshot inode 605 is, in essence, a duplicate copy of the root inode 505 of the file system 500. Thus, the exemplary file system structure 600 includes the same inode file indirect block 510, inode file direct block 512, inodes 515 and file data blocks 520(A-C) as depicted in FIG. 5. When a user modifies a file data block, the file system layer writes the new data block to disk and changes the active file system to point to the newly created block. The file layer does not write new data to blocks which are contained in snapshots.

Figure 7:
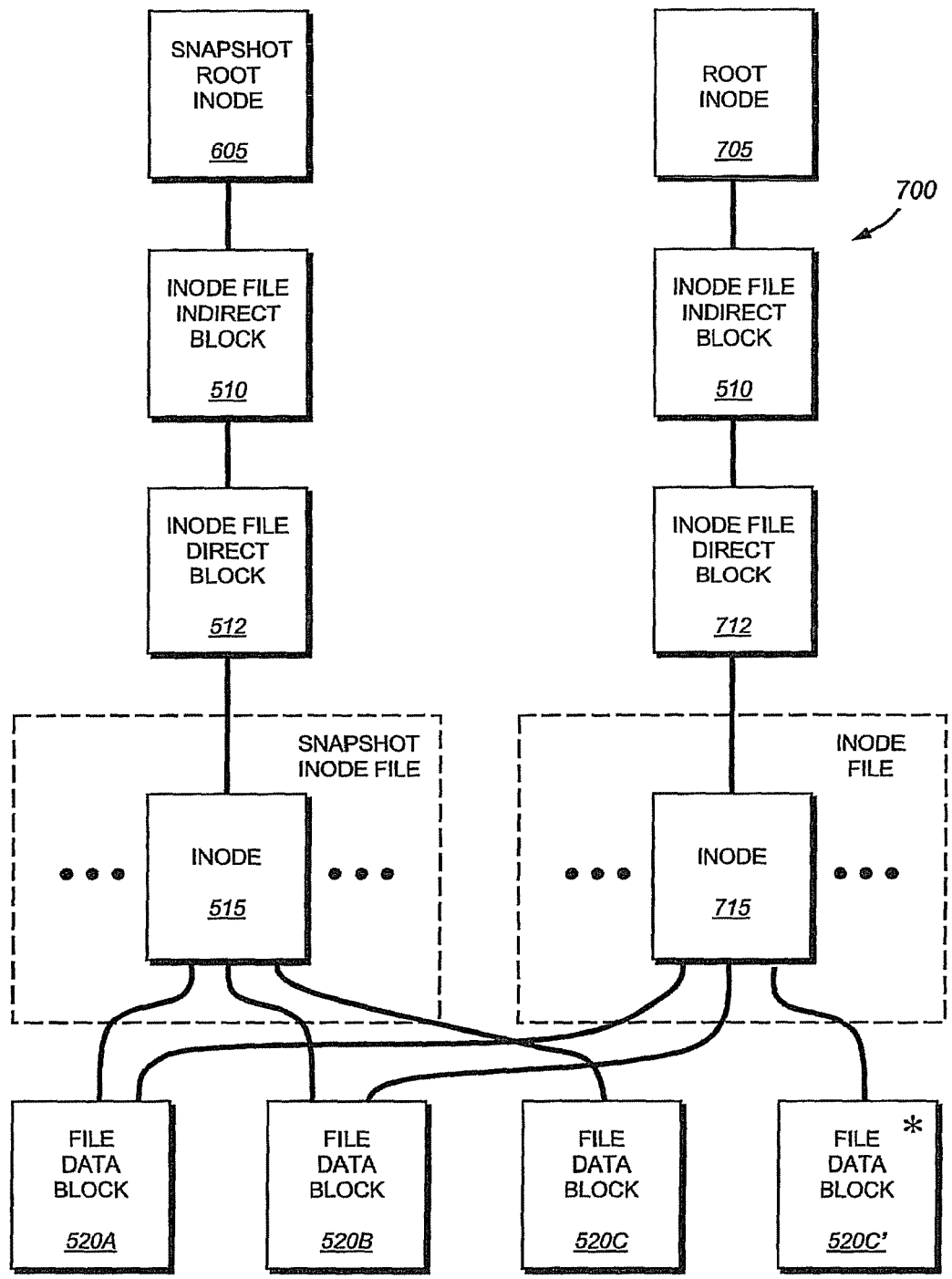
FIG. 7 is a schematic block diagram of the exemplary file system inode structure of FIG. 6 after data block has been rewritten.

FIG. 7 shows an exemplary inode file system structure 700 after a file data block has been modified. In this illustrative example, file data which is stored at disk block 520C is modified. The exemplary WAFL file system writes the modified contents to disk block 520C', which is a new location on disk. Because of this new location, the inode file data which is stored at disk block (515) is rewritten so that it points to block 520C'. This modification causes WAFL to allocate a new disk block (715) for the updated version of the data at 515. Similarly, the inode file indirect block 510 is rewritten to block 710 and direct block 512 is rewritten to block 712, to point to the newly revised inode 715. Thus, after a file data block has been modified the snapshot inode 605 contains a pointer to the original inode file system indirect block 510 which, in turn, contains a link to the inode 515. This inode 515 contains pointers to the original file data blocks 520A, 520B and 520C. However, the newly written inode 715 includes pointers to unmodified file data blocks 520A and 520B. The inode 715 also contains a pointer to the modified file data block 520C' representing the new arrangement of the active file system. A new file system root inode 705 is established representing the new structure 700. Note that metadata in any snapshotted blocks (e.g. blocks 510, 515 and 520C) protects these blocks from being recycled or overwritten until they are released from all snapshots. Thus, while the active file system root 705 points to new blocks 710, 712, 715 and 520C', the old blocks 510, 515 and 520C are retained until the snapshot is fully released.

In accordance with an illustrative embodiment of this invention the source utilizes two snapshots, a "base" snapshot, which represents the image of the replica file system on the destination, and an "incremental" snapshot, which is the image that the source system intends to replicate to the destination, to perform needed updates of the remote snapshot mirror to the destination. In one example, from the standpoint of the source, the incremental snapshot can comprise a most-recent snapshot and the base can comprise a less-recent snapshot, enabling an up-to-date set of changes to be presented to the destination. This procedure shall now be described in greater detail.

D. Remote Mirroring

Having described the general procedure for deriving a snapshot, the mirroring of snapshot information from the source filer 310 (FIG. 3) to a remote destination filer 312 is described in further detail. As discussed generally above, the transmission of incremental changes in snapshot data based upon a comparison of changed blocks in the whole volume is advantageous in that it transfers only incremental changes in data rather than a complete file system snapshot, thereby allowing updates to be smaller and faster. However, a more efficient and/or versatile procedure for incremental remote update of a destination mirror snapshot is contemplated according to an illustrative embodiment of this invention. Note, as used herein the term "replica snapshot," "replicated snapshot" or "mirror snapshot" shall be taken to also refer generally to the file system on the destination volume that contains the snapshot where appropriate (for example where a snapshot of a snapshot is implied.

As indicated above, it is contemplated that this procedure can take advantage of a sub-organization of a volume known as a qtree. A qtree acts similarly to limits enforced on collections of data by the size of a partition in a traditional Unix® or Windows® file system, but with the flexibility to subsequently change the limit, since qtrees have no connection to a specific range of blocks on a disk. Unlike volumes, which are mapped to particular collections of disks (e.g. RAID groups of n disks) and act more like traditional partitions, a qtree is implemented at a higher level than volumes and can, thus, offer more flexibility. Qtrees are basically an abstraction in the software of the storage operating system. Each volume may, in fact, contain multiple qtrees. The granularity of a qtree can be a sized to just as a few kilobytes of storage. Qtree structures can be defined by an appropriate file system administrator or user with proper permission to set such limits.

Note that the above-described qtree organization is exemplary and the principles herein can be applied to a variety of file system organizations including a whole-volume approach. A qtree is a convenient organization according to the illustrative embodiment, at least in part, because of its available identifier in the inode file.

Before describing further the process of deriving changes in two source snapshots, from which data is transferred to a destination for replication of the source at the destination, general reference is made again to the file block structures shown in FIGS. 5-7. Every data block in a file is mapped to disk block (or volume block). Every disk/volume block is enumerated uniquely with a discrete volume block number (VBN). Each file is represented by a single inode, which contains pointers to these data blocks. These pointers are VBNs—each pointer field in an inode having a VBN in it, whereby a file's data is accessed by loading up the appropriate disk/volume block with a request to the file system (or disk control) layer. When a file's data is altered, a new disk block is allocated to store the changed data. The VBN of this disk block is placed in the pointer field of the inode. A snapshot captures the inode at a point in time, and all the VBN fields in it.

In order to scale beyond the maximum number of VBN "pointers" in an inode, "indirect blocks" are used. In essence, a disk block is allocated and filled with the VBNs of the data blocks, the inode pointers then point to the indirect block. There can exist several levels of indirect blocks, which can create a large tree structure. Indirect blocks are modified in the same manner as regular data blocks are—every time a VBN in an indirect block changes, a new disk/volume block is allocated for the altered data of the indirect block.

1. Source

Figure 8:
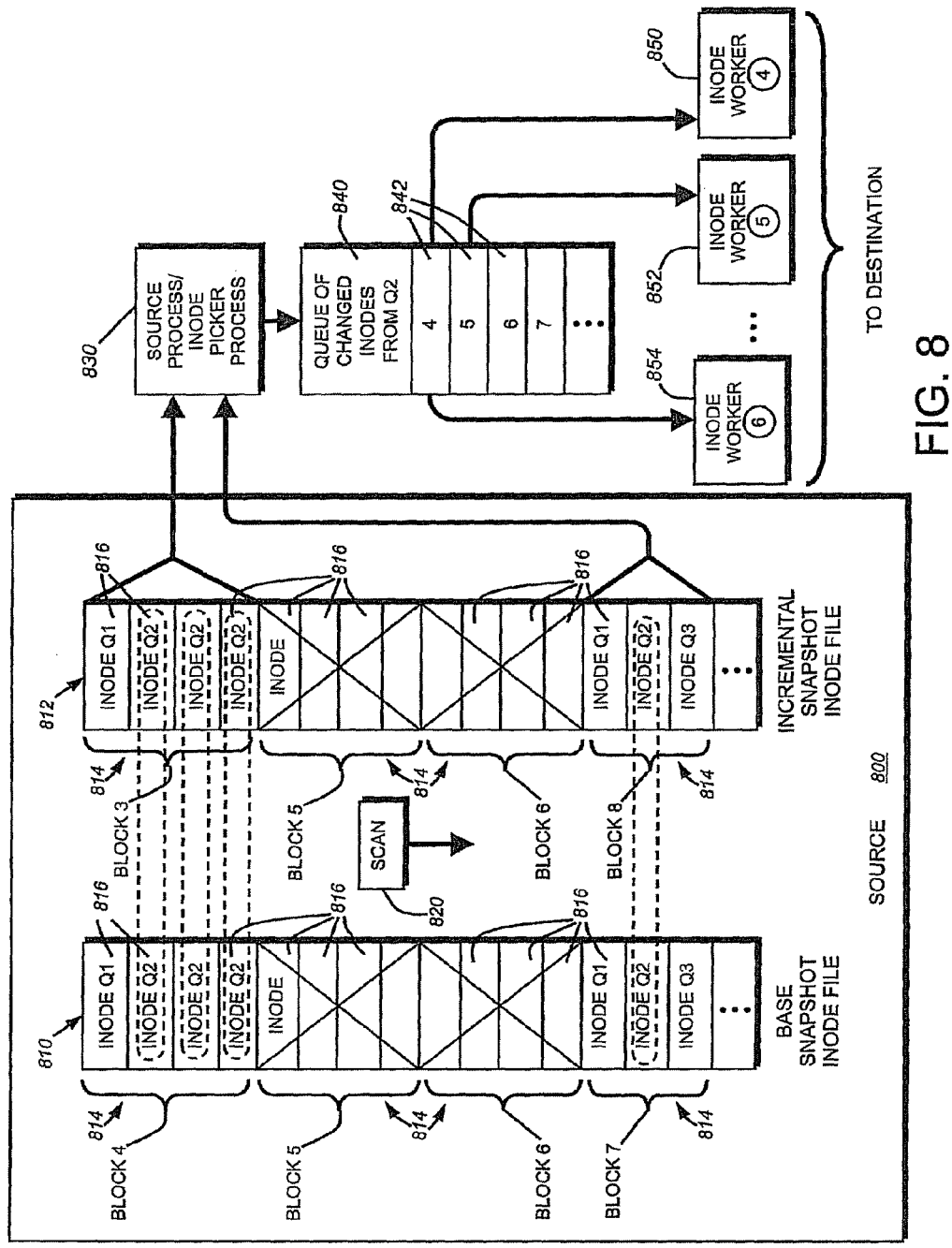
FIG. 8 is a decision table used in connection with an inode picker process in the snapshot mirroring process of FIG. 8.

FIG. 8 shows an exemplary pair of snapshot inode files within the source environment 800. In an illustrative embodiment, these represent two snapshots' inode files: the base 810 and incremental 812. Note that these two snapshots were taken at two points in time; the base represents the current image of the replica, and the incremental represents the image the replica will be updated to. The differences between the two snapshots define which changes are to be derived and committed to the remote replica/mirror. The inode files may each be loaded into the buffer cache of the source file server memory from the on-disk versions thereof using conventional disk access processes as directed by the storage operating system snapshot manager (480 in FIG. 4). In one embodiment, the base and incremental snapshots are loaded in increments as they are worked on by the operating system (rather than all-at-once). Each snapshot inode file 810, 812 is organized into a series of storage blocks 814. In this illustrative example, the base snapshot inode file 810 contains storage blocks denoted by volume (disk) block numbers, 5, 6 and 7, while the incremental snapshot inode file contains exemplary storage blocks having volume block numbers 3, 5, 6 and 8. Within each of the blocks are organized a given number of inodes 816. The volume blocks are indexed in the depicted order based upon their underlying logical file block placement.

In the example of a write-anywhere file layout, storage blocks are not immediately overwritten or reused. Thus changes in a file comprised of a series of volume blocks will always result in the presence of a new volume block number (newly written-to) that can be detected at the appropriate logical file block offset relative to an old block. The existence of a changed volume block number at a given offset in the index between the base snapshot inode file and incremental snapshot inode file generally indicates that one or more of the underlying inodes and files to which the inodes point have been changed. Note, however, that the system may rely on other indicators of changes in the inodes or pointers—this may be desirable where a write-in-place file system is implemented.

A scanner 820 searches the index for changed base/incremental inode file snapshot blocks, comparing volume block numbers or another identifier. In the example of FIG. 8, block 4 in the base snapshot inode file 810 now corresponds in the file scan order to block 3 in the incremental snapshot inode file 812. This indicates a change of one or more underlying inodes. In addition, block 7 in the base snapshot inode file appears as block 8 in the incremental snapshot inode file. Blocks 5 and 6 are unchanged in both files, and thus, are quickly scanned over without further processing of any inodes or other information. Hence, scanned blocks at the same index in both snapshots can be efficiently bypassed, reducing the scan time.

Block pairs (e.g. blocks 7 and 8) that have been identified as changed are forwarded (as they are detected by the scan 820) to the rest of the source process, which includes an inode picker process 830. The inode picker identifies specific inodes (based upon qtree ID) from the forwarded blocks that are part of the selected qtree being mirrored. In this example the qtree ID Q2 is selected, and inodes containing this value in their file metadata are "picked" for further processing. Other inodes not part of the selected qtree(s) (e.g. inodes with qtree IDs Q1 and Q3) are discarded or otherwise ignored by the picker process 830. Note that a multiplicity of qtree IDs can be selected, causing the picker to draw out a group of inodes—each having one of the selected qtree associations.

Figure 8A:
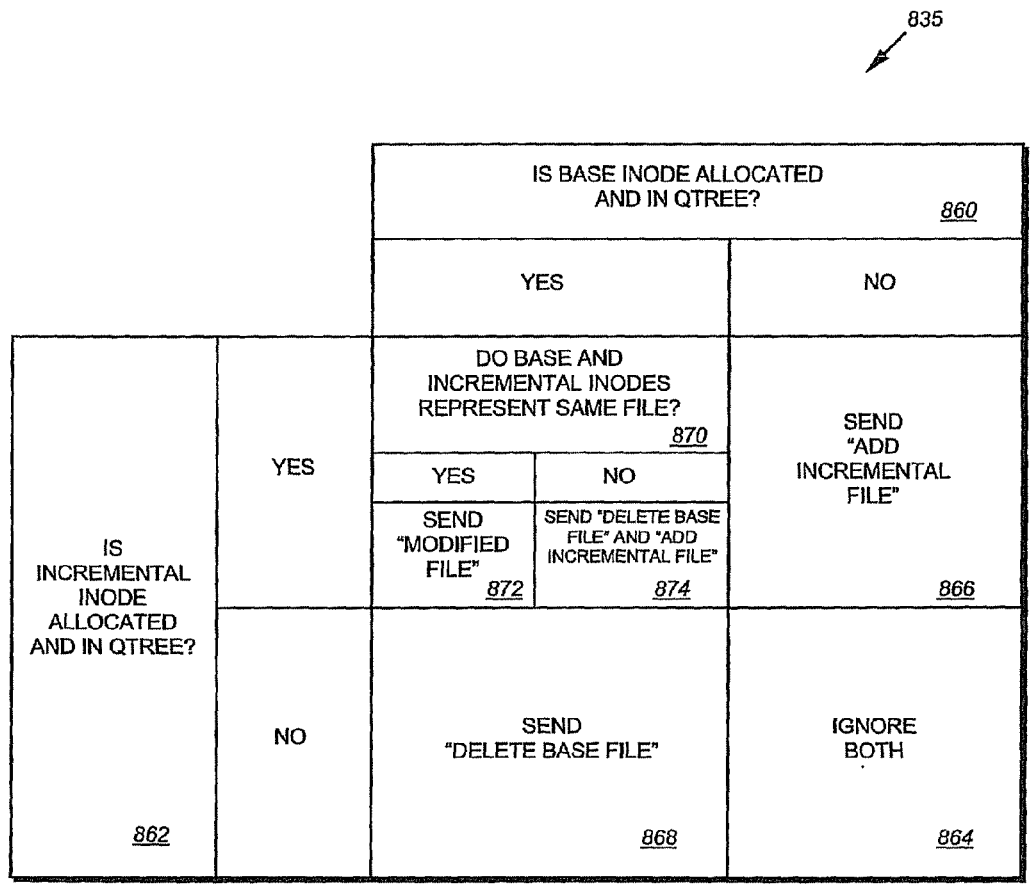
FIG. 8A is a flow diagram of an inode picker process used in connection with the snapshot mirroring process of FIG. 8.

The appropriately "picked" inodes from changed blocks are then formed into a running list or queue 840 of changed inodes 842. These inodes are denoted by a discrete inode number as shown. Each inode in the queue 840 is handed off to an inode handler or worker 850, 852 and 854 as a worker becomes available. FIG. 8A is a table 835 detailing the basic set of rules the inode picker process 830 uses to determine whether to send a given inode to the queue for the workers to process.

The inode picker process 830 queries whether either (1) the base snapshot's version of the subject inode (a given inode number) is allocated and in a selected qtree (box 860) or (2) the incremental snapshot's version of the inode is allocated and in a selected qtree (box 862). If neither the base nor incremental version are allocated and in the selected qtree then both inodes are ignored (box 864) and the next pair of inode versions are queried.

If the base inode is not in allocated or not in the selected qtree, but the incremental inode is allocated and in the selected qtree, then this implies an incremental file has been added, and the appropriate inode change is sent to the workers (box 866). Similarly, if the base inode is allocated in the selected qtree, but the incremental inode is not allocated or not in the selected qtree, then this indicates a base file has been deleted and this is sent on to the destination via the data stream format (as described below) (box 868).

Finally, if a base inode and incremental inode are both allocated and in the selected qtree, then the process queries whether the base and incremental inodes represent the same file (box 870). If they represent the same file, then the file or its metadata (permissions, owner, permissions, etc) may have changed. This is denoted by different generation numbers on different versions of the inode number being examined by the picker process. In this case, a modified file is sent and the inode workers compare versions to determine exact changes as described further below (box 872). If the base and incremental are not the exact same file, then this implies a deletion of the base file and addition of an incremental file (box 874). The addition of the incremental file is noted as such by the picker in the worker queue.

FIG. 8B is a more detailed view of the information contained in exemplary changed blocks (block 10) in the base snapshot 810 and (block 12) in the incremental snapshot 812, respectively. Inode 2800 is unallocated in the base inode file and allocated in the incremental inode file. This implies that the file has been added to the file system. The inode picker process also notes that this inode is in the proper qtree Q2 (in this example). This inode is sent to the changed inode queue for processing, with a note that the whole file is new.

Inode 2801 is allocated in both inode files. It is in the proper qtree Q2, and the two versions of this inode share the same generation number. This means that the inode represents the same file in the base and the incremental snapshots. It is unknown at this point whether the file data itself has changed, so the inode picker sends the pair to the changed inode queue, and a worker determines what data has changed. Inode 2802 is allocated in the base inode file, but not allocated in the incremental inode file. The base version of the inode was in the proper qtree Q2. This means this inode has been deleted. The inode picker sends this information down to the workers as well. Finally, inode 2803 is allocated in the base inode file, and reallocated in the incremental inode file. The inode picker 830 can determine this because the generation number has changed between the two versions (from #1-#2). The new file which this inode represents has been added to the qtree, so like inode 2800, this is sent to the changed inode queue for processing, with a note that the whole file is new.

A predetermined number of workers operate on the queue 840 at a given time. In the illustrative embodiment, the workers function in parallel on a group of inodes in the queue. That is, the workers process inodes to completion in no particular order once taken from the queue and are free process further inodes from the queue as soon as they are available. Other processes, such as the scan 820 and picker 830 are also interleaved within the overall order.

The function of the worker is to determine changes between each snapshot's versions of the files and directories. As described above, the source snapshot mirror application is adapted to analyze two versions of inodes in the two snapshots and compares the pointers in the inodes. If the two versions of the pointers point to the same block, we know that that block hasn't changed. By extension, if the pointer to an indirect block has not changed, then that indirect block has no changed data, so none of its pointers can have changed, and, thus, none of the data blocks underneath it in the tree have changed. This means that, in a very large file, which is mostly unchanged between two snapshots, the process can skip over/overlook VBN "pointers" to each data block in the tree to query whether the VBNs of the data blocks have changed.

Figure 9:
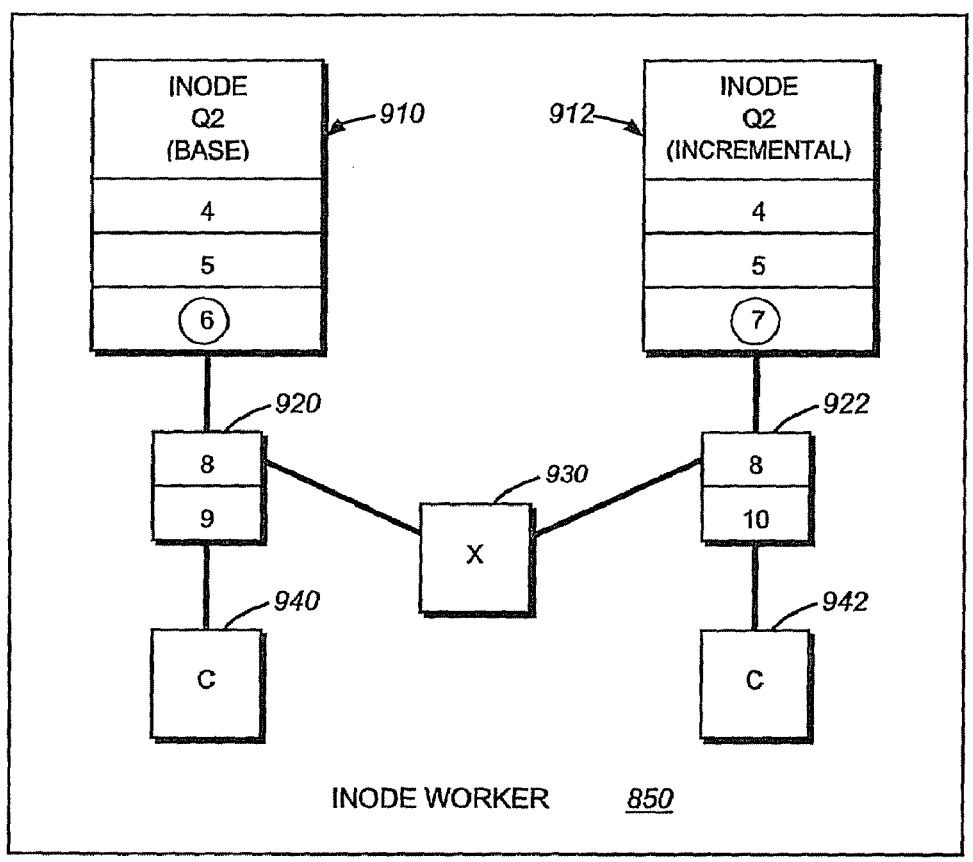
FIG. 9 is a schematic block diagram of an exemplary operation of an inode worker used in connection with the snapshot mirroring process of FIG. 8.

The operation of a worker 850 is shown by way of example in FIG. 9. Once a changed inode pair are received by the worker 850, each inode (base and incremental, respectively) 910 and 912 is scanned to determine whether the file offset between respective blocks is a match. In this example, blocks 6 and 7 do not match. The scan then continues down the "tree" of blocks 6 and 7, respectively, arriving at underlying indirect blocks 8/9 (920) and 8/10 (922). Again the file offset comparison indicates that blocks 8 both arrive at a common block 930 (and thus have not changed). Conversely, blocks 9 and 10 do not match due to offset differences and point to changed blocks 940 and 942. The changed block 942 and the metadata above can be singled out for transmission to the replicated snapshot on the destination (described below; see also FIG. 8). The tree, in an illustrative embodiment extends four levels in depth, but this procedure may be applied to any number of levels. In addition, the tree may in fact contain several changed branches, requiring the worker to traverse each of the branches in a recursive manner until all changes are identified. Each inode worker, thus, provides the changes to the network for transmission in a manner also described below. In particular, new blocks and information about old, deleted blocks are sent to the destination. Likewise, information about modified blocks is sent.

Notably, because nearly every data structure in this example is a file, the above-described process can be applied not only to file data, but also to directories, access control lists (ACLs) and the inode file itself.

It should be again noted, that the source procedure can be applied to any level of granularity of file system organization, including an entire volume inode file. By using the inherent qtree organization a quick and effective way to replicate a known subset of the volume is provided.

2. Communication Between Source and Destination

Figure 10:
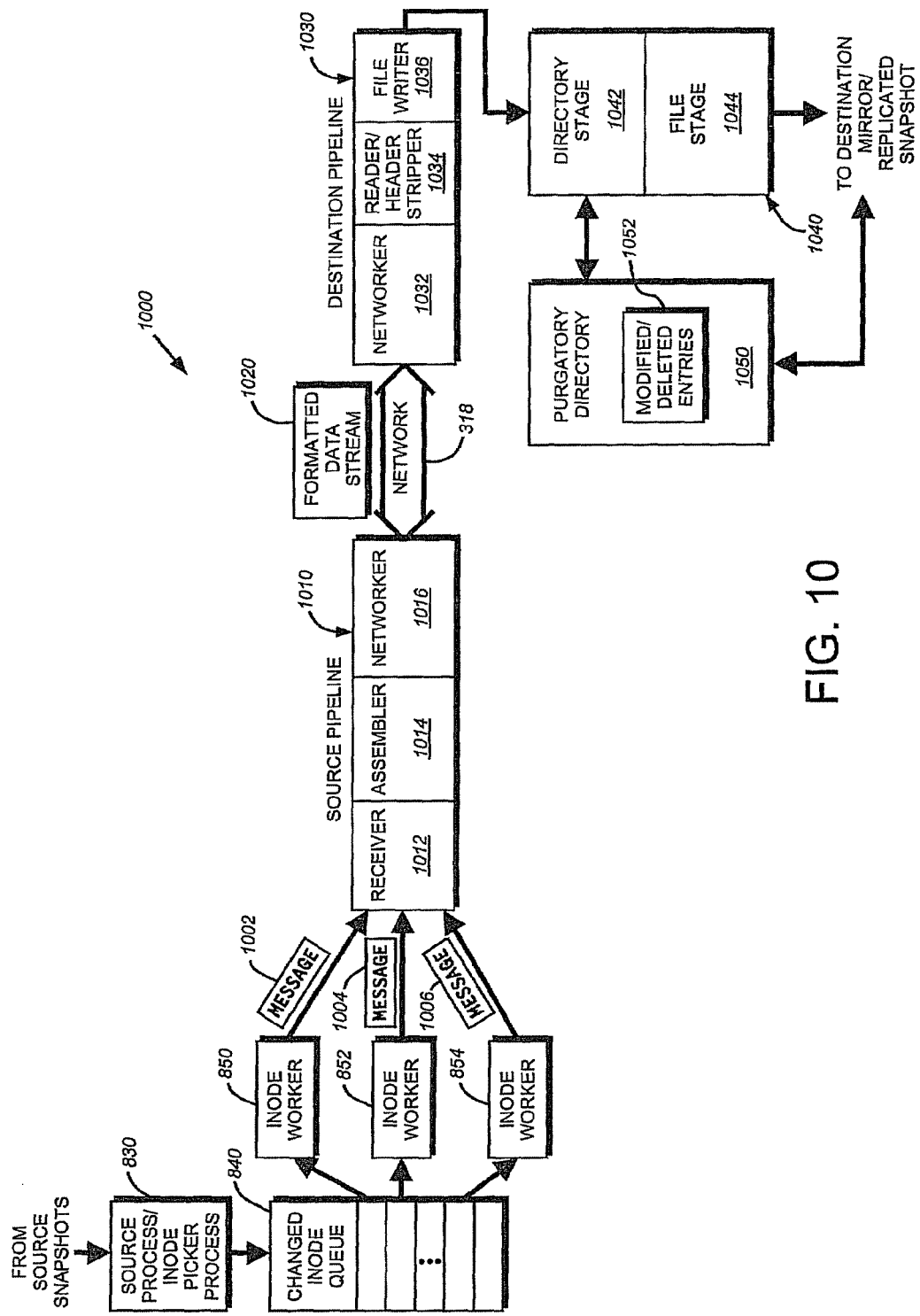
FIG. 10 is a schematic block diagram of the source file server snapshot mirroring process, the destination snapshot mirroring process, and the communication link between them.

With further reference to FIG. 10, the transmission of changes from the source snapshot to the replicated destination snapshot is described in an overview 1000. As already described, the old and new snapshots present the inode picker 830 with changed inodes corresponding to the qtree or other selected sub-organization of the subject volume. The changed inodes are placed in the queue 840, and then their respective trees are walked for changes by a set of inode workers 850, 852 and 854. The inode workers each send messages 1002, 1004 and 1006 containing the change information to a source pipeline 1010. Note that this pipeline is only an example of a way to implement a mechanism for packaging file system data into a data stream and sending that stream to a network layer. The messages are routed first to a receiver 1012 that collects the messages and sends them on to an assembler 1014 as a group comprising the snapshot change information to be transmitted over the network 318. Again, the "network" as described herein should be taken broadly to include anything that facilitates transmission of volume sub-organization (e.g. qtree) change data from a source sub-organization to a destination sub-organization, even where source and destination are on the same file server, volume or, indeed (in the case of rollback as described in the above-incorporated U.S. Pat. No. 7,225,204, issued on May 29, 2007, entitled SYSTEM AND METHOD FOR ASYNCHRONOUS MIRRORING OF SNAPSHOTS AT A DESTINATION USING A PURGATORY DIRECTORY AND INODE MAPPING) are the same sub-organization at different points in time. An example of a "network" used as a path back to the same volume is a loopback. The assembler 1014 generates a specialized format 1020 for transmitting the data stream of information over the network 318 that is predictable and understood by the destination. The networker 1016 takes the assembled data stream and forwards it to a networking layer. This format is typically encapsulated within a reliable networking protocol such as TCP/IP. Encapsulation can be performed by the networking layer, which constructs, for example, TCP/IP packets of the formatted replication data stream.

The format 1020 is described further below. In general, its use is predicated upon having a structure that supports multiple protocol attributes (e.g. Unix permissions, NT access control lists (ACLs), multiple file names, NT streams, file type, file-create/modify time, etc.). The format should also identity the data in the stream (i.e. the offset location in a file of specific data or whether files have "holes" in the file offset that should remain free). The names of files should also be relayed by the format. More generally, the format should also be independent of the underlying network protocol or device (in the case of a tape or local disk/non-volatile storage) protocol and file system—that is, the information is system "agnostic," and not bound to a particular operating system software, thereby allowing source and destination systems of different vendors to share the information. The format should, thus, be completely self-describing requiring no information outside the data stream. In this manner a source file directory of a first type can be readily translated into destination file directory of a different type. It should also allow extensibility, in that newer improvements to the source or destination operating system should not affect the compatibility of older versions. In particular, a data set (e.g. a new header) that is not recognized by the operating system should be ignored or dealt with in a predictable manner without triggering a system crash or other unwanted system failure (i.e. the stream is backwards compatible). This format should also enable transmission of a description of the whole file system, or a description of only changed blocks/information within any file or directory. In addition, the format should generally minimize network and processor overhead.

As changed information is forwarded over the network, it is received at the destination pipeline piece 1030. This pipeline also includes a networker 1032 to read out TCP/IP packets from the network into the snapshot replication data stream format 1020 encapsulated in TCP/IP. A data reader and header stripper 1034 recognizes and responds to the incoming format 1020 by acting upon information contained in various format headers (described below). A file writer 1036 is responsible for placing file data derived from the format into appropriate locations on the destination file system.

The destination pipeline 1030 forwards data and directory information to the main destination snapshot mirror process 1040, which is described in detail below. The destination snapshot mirror process 1040 consists of a directory stage 1042, which builds the new replicated file system directory hierarchy on the destination side based upon the received snapshot changes. To briefly summarize, the directory stage creates, removes and moves files based upon the received formatted information. A map of inodes from the destination to the source is generated and updated. In this manner, inode numbers on the source file system are associated with corresponding (but typically different) inode numbers on the destination file system. Notably, a temporary or "purgatory" directory 1050 (described in further detail below) is established to retain any modified or deleted directory entries 1052 until these entries are reused by or removed from the replicated snapshot at the appropriate directory rebuilding stage within the directory stage. In addition, a file stage 1044 of the destination mirror process populates the established files in the directory stage with data based upon information stripped from associated format headers.

Figure 11:
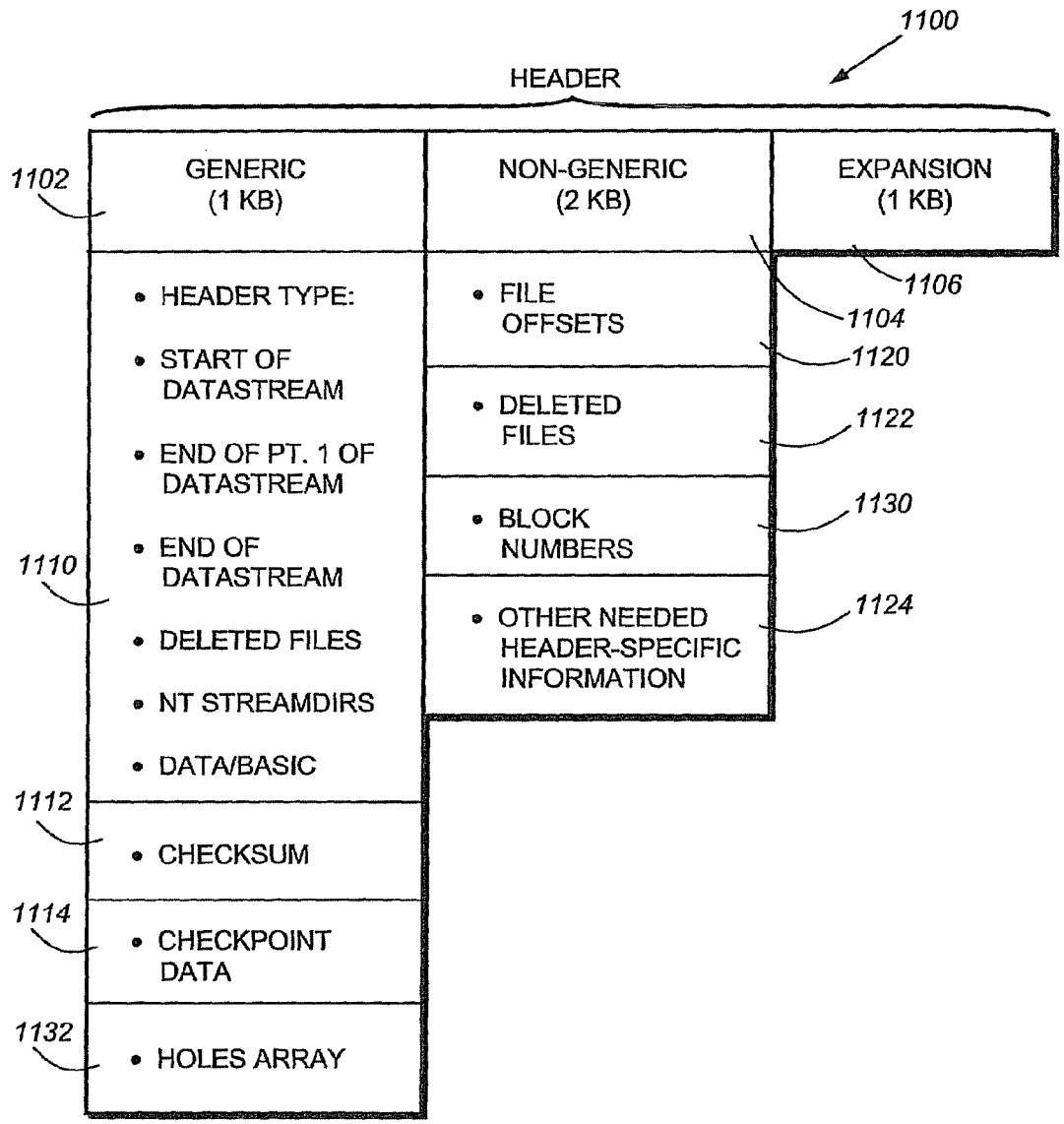
FIG. 11 is a schematic block diagram of a standalone header structure for use in the data stream transmission format between the source and the destination according to an illustrative embodiment.
Figure 12:
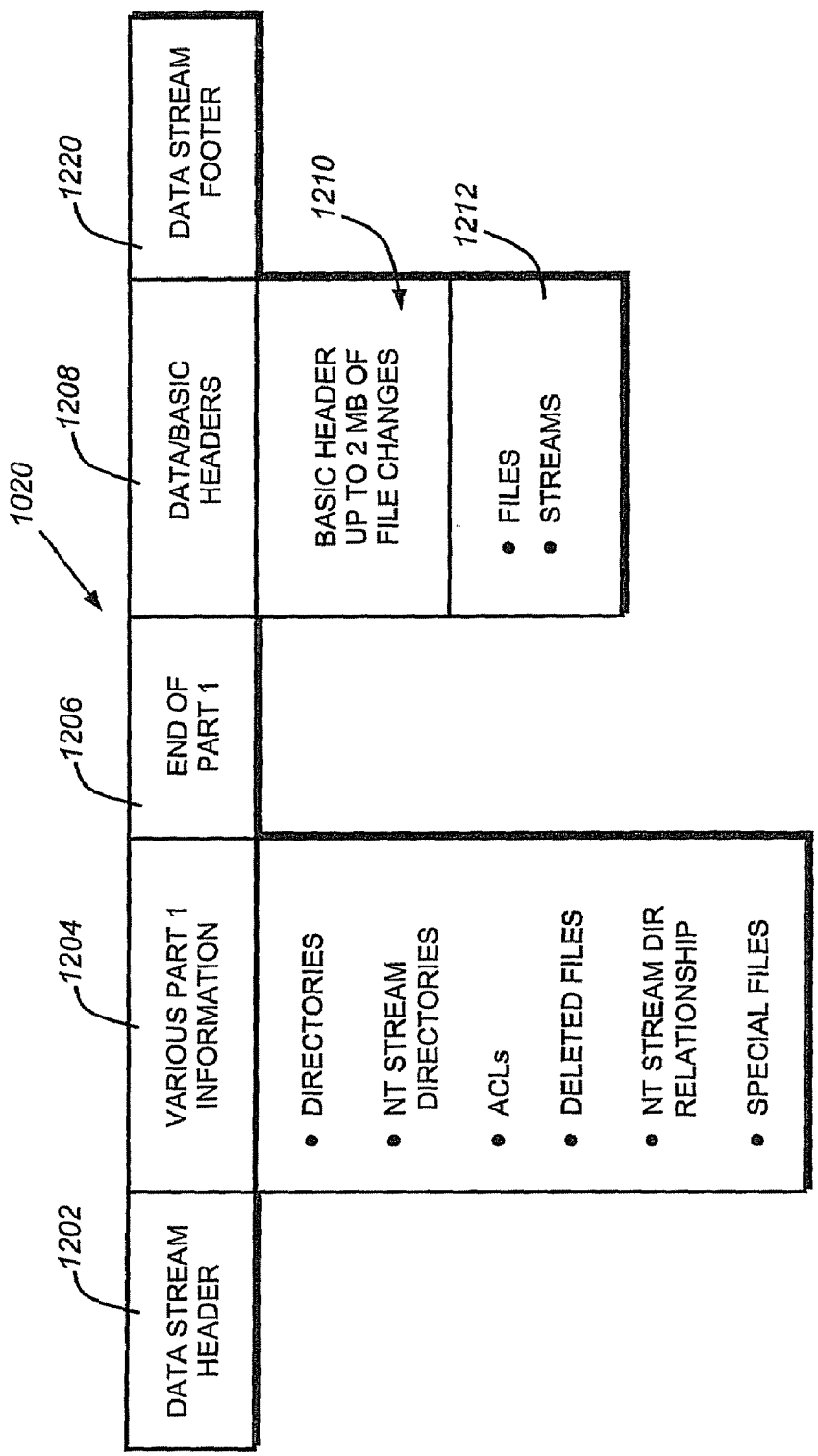
FIG. 12 is a schematic block diagram of the data stream transmission format between the source and the destination according to an illustrative embodiment.

The format into which source snapshot changes are organized is shown schematically in FIGS. 11 and 12. In the illustrative embodiment, the format is organized around 4 KB blocks. The header size and arrangement can be widely varied in alternate embodiments, however. There are 4 KB headers (1100 in FIG. 11) that are identified by certain "header types." Basic data stream headers ("data") are provided for at most every 2 megabytes (2 MB) of changed data. With reference to FIG. 11, the 4 KB standalone header includes three parts, a 1 KB generic part 1102, a 2 KB non-generic part 1104, and an 1 KB expansion part. The expansion part is not used, but is available for later versions.

The generic part 1102 contains an identifier of header type 1110. Standalone header types (i.e. headers not followed by associated data) can indicate a start of the data stream; an end of part one of the data stream; an end of the data stream; a list of deleted files encapsulated in the header; or the relationship of any NT streamdirs. Later versions of Windows NT allow for multiple NT "streams" related to particular filenames. A discussion of streams is found in U.S. patent application Ser. No. 09/891,159, issued as U.S. Pat. No. 6,643,654 on Nov. 4, 2003, entitled SYSTEM AND METHOD FOR REPRESENTING NAMED DATA STREAMS WITHIN AN ON-DISK STRUCTURE OF A FILE SYSTEM, by Kayuri Patel, et al, the teachings of which are expressly incorporated herein by reference. Also in the generic part 1102 is a checksum 1112 that ensures the header is not corrupted. In addition other data such as a "checkpoint" 1114 used by the source and destination to track the progress of replication is provided. By providing a list of header types, the destination can more easily operate in a backwards-compatible mode—that is, a header type that is not recognized by the destination (provided from a newer version of the source) can be more easily ignored, while recognized headers within the limits of the destination version are processed as usual.

The kind of data in the non-generic part 1104 of the header 1100 depends on the header type. It could include information relating to file offsets (1120) in the case of the basic header, used for follow-on data transmission, deleted files (in a standalone header listing of such files that are no longer in use on the source or whose generation number has changed) (1122), or other header-specific information (1124 to be described below). Again, the various standalone headers are interposed within the data stream format at an appropriate location. Each header is arranged to either reference an included data set (such as deleted files) or follow-on information (such as file data).

FIG. 12 describes the format 1020 of the illustrative replication data stream in further detail. The format of the replicated data stream is headed by a standalone data stream header 1202 of the type "start of data stream." This header contains data in the non-generic part 1104 generated by the source describing the attributes of the data stream.

Next a series of headers and follow-on data in the format 1020 define various "part 1" information (1204). Significantly, each directory data set being transmitted is preceded by a basic header with no non-generic data. Only directories that have been modified are transmitted, and they need not arrive in a particular order. Note also that the data from any particular directory need not be contiguous. Each directory entry is loaded into a 4 KB block. Any overflow is loaded into a new 4 KB block. Each directory entry is a header followed by one or more names. The entry describes an inode and the directory names to follow. NT stream directories are also transmitted.

The part 1 format information 1204 also provides ACL information for every file that has an associated ACL. By transmitting the ACLs before their associated file data, the destination can set ACLs before file data is written. ACLs are transmitted in a "regular" file format. Deleted file information (described above) is sent with such information included in the non-generic part 1104 of one or more standalone headers (if any). By sending this information in advance, the directory tree builder can differentiate between moves and deletes.

The part 1 format information 1204 also carries NT stream directory (streamdir) relationship information. One or more standalone headers (if any) notifies the destination file server of every changed file or directory that implicates NT streams, regardless of whether the streams have changed. This information is included in the non-generic part 1104 of the header 1100 (FIG. 11).

Finally, the part 1 format information 1204 includes special files for every change in a symlink, named pipe, socket, block device, or character device in the replicated data stream. These files are sent first, because they are needed to assist the destination in building the infrastructure for creation of the replicated file system before it is populated with file data. Special files are, like ACLs, transmitted in the format of regular files.

Once various part 1 information 1204 is transmitted, the format calls for an "end of part 1 of the data stream" header 1206. This is a basic header having no data in the non-generic part 1104. This header tells the destination that part 1 is complete and to now expect file data.

After the part 1 information, the format presents the file and stream data 1208. A basic header 1210 for every 2 MB or less of changed data in a file is provided, followed by the file data 1212 itself. The files comprising the data need not be written in a particular order, nor must the data be contiguous. In addition, referring to the header in FIG. 11, the basic header includes a block numbers data structure 1130, associated with the non-generic part 1104 works in conjunction with the "holes array" 1132 within (in this example) the generic part 1102. The holes array denotes empty space. This structure, in essence, provides the mapping from the holes array to corresponding blocks in the file. This structure instructs the destination where to write data blocks or holes.

In general files (1212) are written in 4 KB chunks with basic headers at every 512 chunks (2 MB), at most. Likewise, streams (also 1212) are transmitted like regular files in 4 KB chunks with at most 2 MB between headers.

Finally, the end of the replicated data stream format 1020 is marked by a footer 1220 consisting of standalone header of the type "end of data stream." This header has no specific data in its non-generic part 1104 (FIG. 11).

3. Destination

Figure 13:
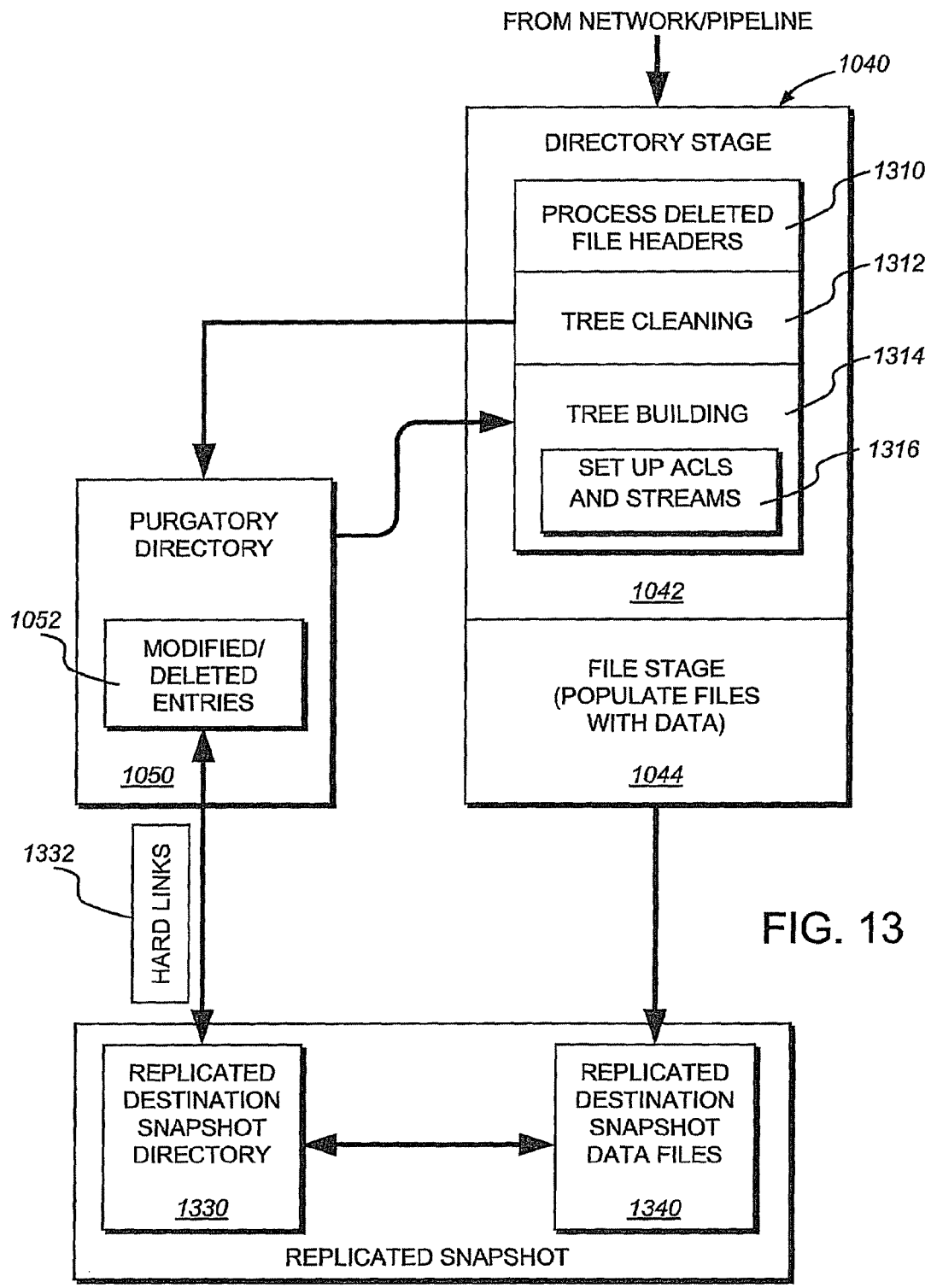
FIG. 13 is a schematic block diagram of the stages of the snapshot mirroring process on the destination.

When the remote destination (e.g. a remote file server, remote volume, remote qtree or the same qtree) receives the formatted data stream from the source file server via the network, it creates a new qtree or modifies an existing mirrored qtree (or another appropriate organizational structure) and fills it with data. FIG. 13 shows the destination snapshot mirror process 1040 in greater detail. As discussed briefly above, the process consists of two main parts, a directory stage 1042 and a data or file stage 1044.

The directory stage 1042 is invoked first during a transmission the data stream from the source. It consists of several distinct parts. These parts are designed to handle all part 1 format (non-file) data. In an illustrative embodiment the data of part 1 is read into the destination, stored as files locally, and then processed from local storage. However, the data may alternatively be processed as it arrives in realtime.

More particularly, the first part of the directory stage 1042 involves the processing of deleted file headers (1310). Entries in the inode map (described further below) are erased with respect to deleted files, thereby severing a relation between mapped inodes on the replicated destination snapshot and the source snapshot.

Next the directory stage undertakes a tree cleaning process (1312). This step removes all directory entries form the replicated snapshot directory 1330 that have been changed on the source snapshot. The data stream format (1020) indicates whether a directory entry has been added or removed. In fact, directory entries from the base version of the directory and directory entries from the incremental version of the directory are both present in the format. The destination snapshot mirror application converts the formatted data stream into a destination directory format in which each entry that includes an inode number, a list of relative names (e.g. various multi-protocol names) and a "create" or "delete" value. In general each file also has associated therewith a generation number. The inode number and the generation number together form a tuple used to directly access a file within the file system (on both the source and the destination). The source sends this tuple information to the destination within the format and the appropriate tuple is stored on the destination system. Generation numbers that are out of date with respect to existing destination files indicate that the file has been deleted on the source. The use of generation numbers is described further below.

The destination processes base directory entries as removals and incremental directory entries as additions. A file which has been moved or renamed is processed as a delete (from the old directory or from the old name), then as an add (to the new directory or with a new name). Any directory entries 1052 that are deleted, or otherwise modified, are moved temporarily to the temporary or "purgatory" directory, and are not accessible in this location by users. The purgatory directory allows modified entries to be, in essence, "moved to the side" rather than completely removed as the active file system's directory tree is worked on. The purgatory directory entries, themselves point to data, and thus prevent the data from becoming deleted or losing a link to a directory altogether.

On a base transfer of a qtree to the destination, the directory stage tree building process is implemented as a breadth-first traversal of all the files and directories in the data stream, starting with the root of the qtree. The directory stage then undertakes the tree building process, which builds up all the directories with stub entries for the files. However, the depicted incremental directory stage (1042), as typically described herein, differs from a base transfer in that the tree building process (1314) begins with a directory queue that includes all modified directories currently existing on both the source and the destination (i.e. the modified directories that existed prior to the transfer). The incremental directory stage tree building process then processes the remainder of the directories according to the above-referenced breadth-first approach.

For efficiency, the source side depends upon inode numbers and directory blocks rather than pathnames. In general, a file in the replicated directory tree (a qtree in this example) on the destination cannot expect to receive the same inode number as the corresponding file has used on the source (although it is possible). As such, an inode map is established in the destination. This map 1400, shown generally in FIG. 14, enables the source to relate each file on the source to the destination. The mapping is based generally upon file offsets. For example a received source block having "offset 20 KB in inode 877" maps to the block at offset 20 KB in replicated destination inode 9912. The block can then be written to the appropriate offset in the destination file.

More specifically, each entry in the inode map 1400 contains an entry for each inode on the source snapshot. Each inode entry 1402 in the map is indexed and accessed via the source inode number (1404). These source inodes are listed in the map in a sequential and monotonically ascending order, notwithstanding the order of the mapped destination inodes. Under each source inode number (1404), the map includes: the source generation number (1406) to verify that the mapped inode matches the current file on the source; the destination inode number (1408); and destination generation number (1410). As noted above, the inode number and generation number together comprise a tuple needed to directly access an associated file in the corresponding file system.

By maintaining the source generation number, the destination can determine if a file has been modified or deleted on the source (and its source associated inode reallocated), as the source generation number is incremented upwardly with respect to the stored destination. When the source notifies the destination that an inode has been modified, it sends the tuple to the destination. This tuple uniquely identifies the inode on the source system. Each time the source indicates that an entirely new file or directory has to be created (e.g. "create") the destination file system creates that file. When the file is created, the destination registers data as a new entry (1402) in its inode map 1400. Each time the source indicates that an existing file or directory needs to be deleted, the destination obliterates that file, and then clears the entry in the inode map. Notably, when a file is modified, the source only sends the tuple and the data to be applied. The destination loads the source inode's entry from the inode map. If the source generation number matches, then it knows that the file already exists on the destination and needs to be modified. The destination uses the tuple recorded in the inode map to load the destination inode. Finally, it can apply the file modifications by using the inode.

As part of the tree building process reused entries are "moved" back from the purgatory directory to the replicated snapshot directory 1330. Traditionally, a move of a file requires knowledge of the name of the moved file and the name of the file it is being moved to. The original name of the moved file may not be easily available in the purgatory directory. In addition, a full move would require two directories (purgatory and replicated snapshot) to be modified implicating additional overhead.

However, in the illustrative embodiment, if the source inodes received at the destination refer to inodes in the inode map 1400, then the directory stage creates (on the current built-up snapshot directory 1330) a file entry having the desired file name. This name can be exactly the name derived from the source. A hard link 1332 (i.e. a Unix-based link enables multiple names to be assigned to a discrete file) is created between that file on the snapshot directory 1330 and the entry in the purgatory directory. By so linking the entry, it is now pointed to by both the purgatory directory and the file on the snapshot directory itself. When the purgatory directory root is eventually deleted (thereby killing off purgatory) at the end of the data stream transfer, the hard link will remain to the entry, ensuring that the specific entry in the purgatory directory will not be deleted or recycled (given that the entry's link count is still greater than zero) and a path to the data from the file on the new directory is maintained. Every purgatory entry that eventually becomes associated with a file in the newly built tree will be similarly hard linked, and thereby survive deletion of the purgatory directory. Conversely, purgatory entries that are not relinked will not survive, and are effectively deleted permanently when purgatory is deleted.

It should now be clear that the use of mapping and generation number tuples avoids the expensive (from a processing standpoint) use of conventional full file pathnames (or relative pathnames) in the data stream from the source. Files that are modified on the source can be updated on the destination without loading a directory on either the source or destination. This limits the information needed from the source and the amount of processing required. In addition, the source need not maintain a log of directory operations Likewise, since the destination need not maintain a central repository of the current file system state, multiple subdirectories can be operated upon concurrently. Finally, neither the source, nor the destination must explicitly track deleted files as such deleted files are automatically removed. Rather, the source only sends its list of deleted files and the destination uses this list to conform the inode map. As such, there is no need to selectively traverse a tree more than once to delete files, and at the conclusion of the transfer, simply eliminating the purgatory directory is the only specific file cleaning step.

The directory stage 1042 sets up any ACLs on directories as the directories are processed during tree building (substep 1316). As described above, the ACL and NT stream relationships to files are contained in appropriate standalone headers. ACLs are then set on files during the below-described file stage. NT streams are created on files as the files are, themselves, created. Since an NT steam is, in fact, a directory, the entries for it are processed as part of the directory phase.

Figures 14, 15:
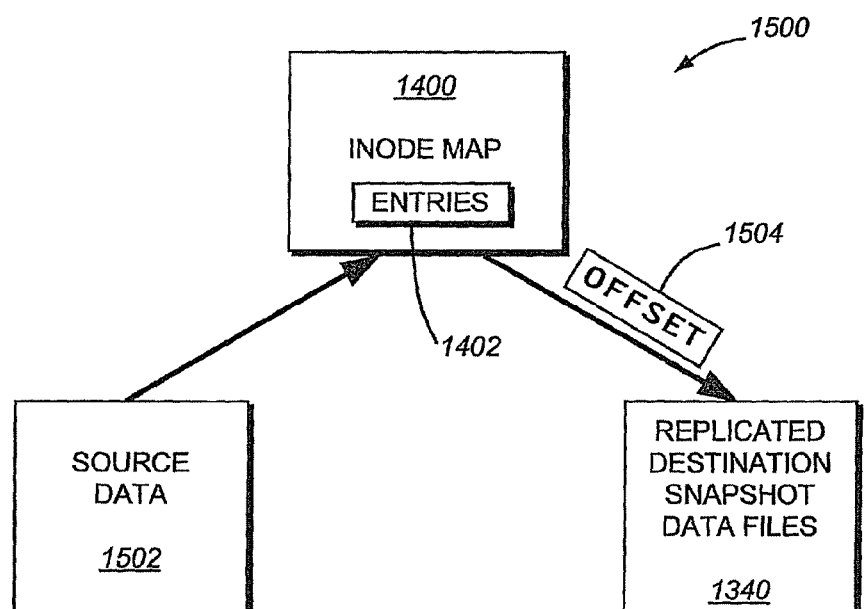
FIG. 14 is a schematic block diagram of a generalized inode map for mapping source inodes to the destination snapshot mirror according to an illustrative embodiment.
FIG. 15 is a highly schematic diagram of the population of data files in the destination snapshot mirror at mapped offsets with respect to source data files.

The new directory tree may contain files with no data or old data. When the "end of part 1" format header is read, the destination mirror process 1040 enters the file stage 1044 in which snapshot data files 1340 referenced by the directory tree are populated with data (e.g. change data). FIG. 15 shows a simplified procedure 1500 for writing file data 1502 received from the source. In general, each (up to) 2 MB of data in 4 KB blocks arrives with corresponding source inode numbers. The inode map 1400 is consulted for corresponding entries 1402. Appropriate offsets 1504 are derived for the data, and it is written into predetermined empty destination snapshot data files 1340.

At the end of both the directory stage 1042 and data stage 1044, when all directory and file data have been processed, and the data stream transfer from the source is complete, the new replicated snapshot is exposed atomically to the user. At this time the contents of the purgatory directory 1050 (which includes any entries that have not be "moved" back into the rebuilt tree) is deleted.

It should be noted that the initial creation (the "level zero" transfer) of the replicated snapshot on the destination follows the general procedures discussed above. The difference between a level zero transfer and a regular update is that there is no base snapshot; so the comparisons always process information in the incremental snapshot as additions and creates rather than modifications. The destination mirror application starts tree building by processing any directories already known to it. The initial directory established in the destination is simply the root directory of the replicated snapshot (the qtree root). A destination root exists on the inode map. The source eventually transmits a root (other files received may be buffered until the root arrives), and the root is mapped to the existing destination root. Files referenced in the root are then mapped in turn in a "create" process as they are received and read by the destination. Eventually, the entire directory is created, and then the data files are populated. After this, a replica file system is complete.

E. Snapshot Access Redirection

As described generally above, the state of the destination mirror snapshot is in constant flux throughout the lazy write update with change data received from the source.

It is undesirable for a user to gain access, or otherwise rely upon, the updating mirror snapshot as it does not accurately reflect the current state of the source snapshot—it has not caught up to the source. In fact, the rebuilding destination mirror snapshot may include incomplete or corrupted information that has yet not been properly rebuilt. To avoid the possibility of access by a user of this updating snapshot, the snapshot is made unavailable by causing a transparent redirection of access by a user away from the currently updating snapshot, and more particularly, by introducing a level of indirection to the file system's inode lookup.

Figure 16:
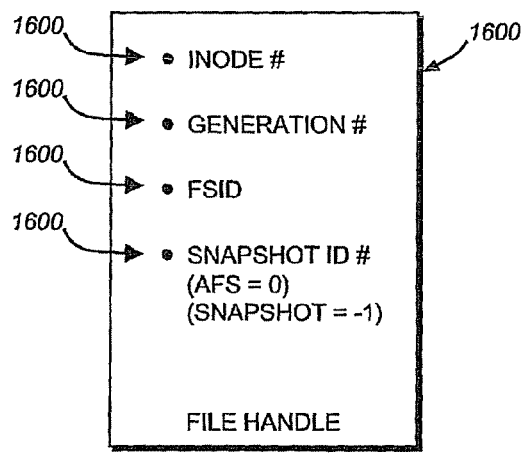
FIG. 16 is a schematic representation of a file system file handle for accessing a selected inode according to an illustrative embodiment.

FIG. 16 shows a schematic representation of a file system "file handle" 1600 used by the file system to retrieve an inode based upon an inode lookup procedure. The file handle includes the inode number 1602, inode generation number 1604, the file system ID (FSID), and the snapshot ID. The snapshot ID indicates the current snapshot state of the inode. In an illustrative embodiment, inodes residing on a destination volume's active file system (AFS) has a snapshot ID value of zero (0).

Figure 17:
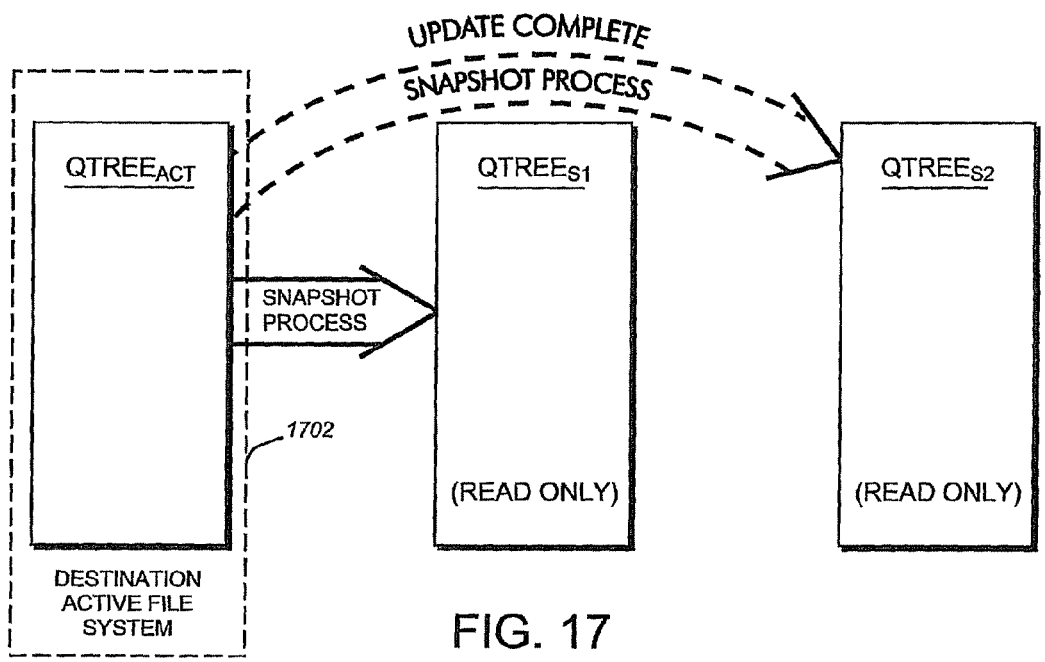
FIG. 17 is a schematic block diagram of a redirection process from a snapshot being updated on the active file system of the destination local read only snapshots according to an illustrative embodiment.

Referencing also FIG. 17, a qtree ($QTREE_{ACT}$) on the active file system 1702 is updating as the source transmits information. To clarify, the active file system qtree 1702 is the continually updated replicated mirror snapshot on the destination. The active file system qtree, while being updated is unstable. Note another sub-organization can be used and qtree is exemplary only.

Simply stated, the snapshot process on the destination creates a read only snapshot ($QTREE_{S1}$) before the most-recent update of the active file system qtree ($QTREE_{ACT}$) by the source. In the illustrative embodiment, this snapshot becomes the copy that users and most internal processes are directed to access when a request for an inode is processed. It is treated as the active file system for this purpose, leaving the actual active file system to continue updating without intervention by accessing clients or destination applications. In essence, the snapshot ($QTREE_{S1}$) is copy of the last stable state of the active file system (replicated mirror) qtree ($QTREE_{ACT}$), which is, in fact, a mirror of the base snapshot on the source. When the update of the active file system qtree ($QTREE_{ACT}$) is complete, the snapshot process creates a new read only snapshot of the active (now-updated) qtree ($QTREE_{S2}$), and that becomes the latest exported (accessible/visible on the destination) snapshot, whilst the earlier snapshot ($QTREE_{S1}$) is eventually deleted. When switching between snapshots, the file handle does not change. Rather a level of indirection allows the change in accessible snapshot. This ensures that a deleted file does not inadvertently become returned to the active file system.

Traditionally, a file system inode lookup to service a requesting client (NFS, CIFS, HTTP, etc.) begins by having the destination determine the snapshot ID from the file handle. Then, depending on the snapshot ID, the destination searches either the snapshot or active file system for the selected inode. Finally the located inode is returned.

Figure 18:
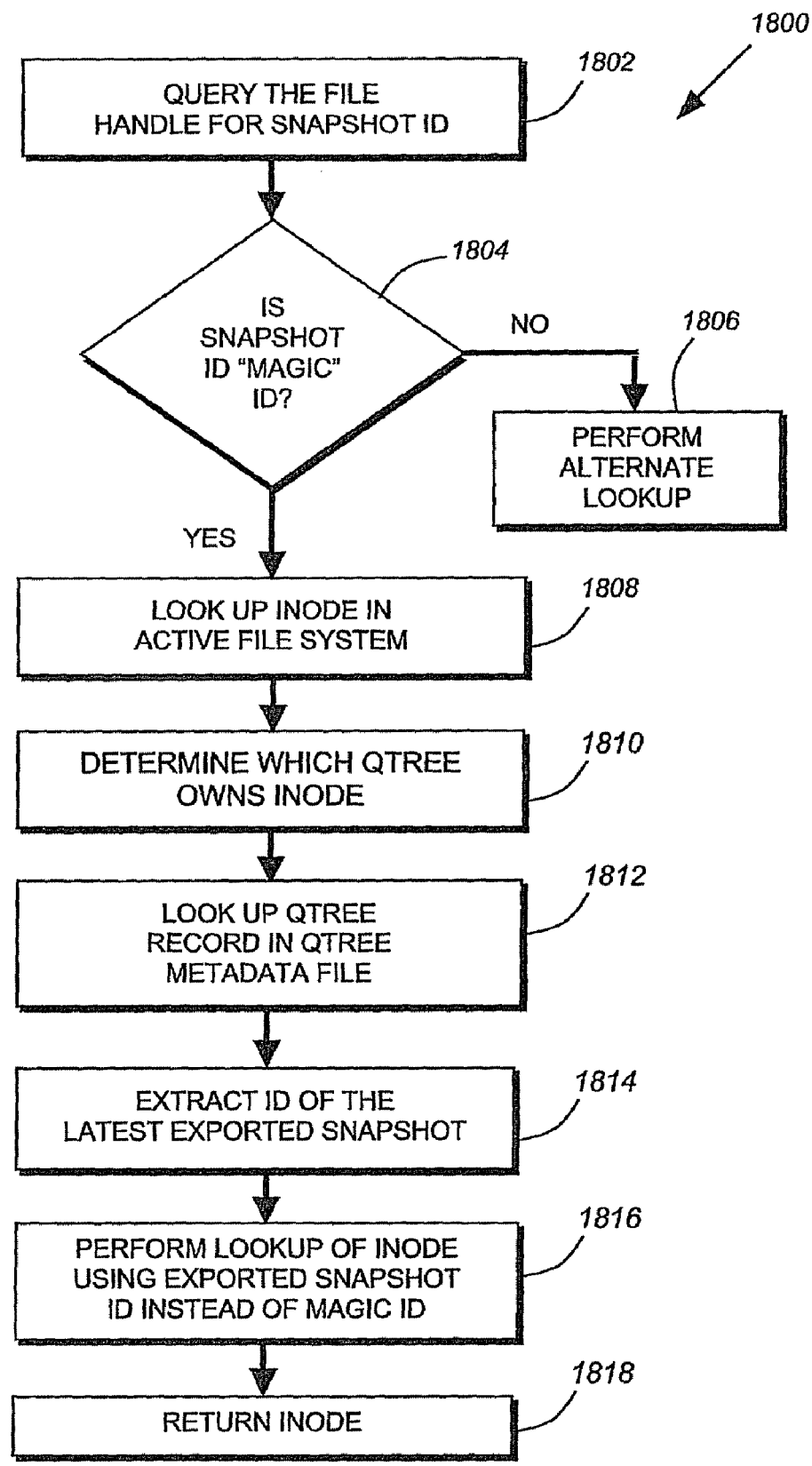
FIG. 18 is flow diagram of a redirection procedure according to an illustrative embodiment.

According to an illustrative embodiment, FIG. 18 describes the procedure 1800 for accessing an inode. First, the file system queries the file handle to determine the snapshot ID (step 1802). The procedure looks for a "magic ID" having a value (in this example) of minus-one (−1). This is indicative of the last exported snapshot. If the value is not the magic ID, then the procedure branches (via decision step 1804) to perform alternate lookup steps 1806, including the basic steps described above. This can occur when a non-snapshotted qtree or other part of the volume is accessed. Assuming the magic ID is set in the file handle (via decision step 1804), then the inode is looked up in the active file system (step 1808). The procedure then determines which qtree "owns" the subject inode (step 1810). Then, in step 1812, the identified qtree entry is looked up in a qtree metadata file (described in detail below) that stores information related to qtrees on the destination volume outside the qtrees, themselves. Another location can be used in an alternate embodiment. From the metadata file, the ID for the latest exported snapshot of the qtree is extracted (step 1814). Note that this step can be simplified as the subject snapshot ID can be cached for ready access, thereby eliminating the need to look it up in the metadata file. In step 1816, the procedure performs a "classic" lookup of the inode using the exported snapshot ID instead of the magic ID. Using the lookup with the snapshot ID, the inode is returned from the latest exported snapshot (step 1818).

The destination mirror application tracks the latest exported snapshot and rewrites that information to the metadata file as new snapshots are created on the destination. In particular, once each new snapshot is created at the conclusion of the data stream transfer, all information pertinent to the snapshot is looked up. This information includes the unique snapshot identifier, qtree ID, etc. form appropriate inodes including the root directory and/or other locations for storing metadata about the snapshot. This data is then written to appropriate fields in the metadata file (described further below). This information is typically written to a special NVRAM log (NVLOG—also described below) that provides a stable storage location with the ability to survive a disaster. The commitment to the NVLOG is handled by the file system as a regular file write, with relatively low overhead and straightforward processing.

In this manner, redirection enables the active file system qtree to be continually updated without interference by (or interfering with) accessing clients or processes. The data presented to such clients and processes is guaranteed to be a stable replica of the previous (second-most-recent) snapshot on the source. When the next exported snapshot becomes available (at the end of the update from the source), the new stable qtree is presented to the users and processes in an atomic changeover. This is now the snapshot to which users are transparently redirected based upon the above-described magic ID and information in the qtree metadata file.

F. Metadata File

In the prior art, the state information needed for each qtree (or volume sub-organization) has been stored typically in the root inode of the tree. As discussed above—the size of the root inode's storage limits the amount state information, in the form of metadata, that can reside in it. Since, all inodes are sized equally in a common file system arrangement, any increase in root storage size propagates through all inodes, and thereby wastes substantial storage space. In addition, when the file system needs to determine the number of qtrees in a volume, or other information, it must scan the root directory and examine every qtree. This problem may be alleviated by storing information outside of inodes. The storage a more-complex form of fileset information is employed by DFS available from IBM Corporation of Armonk, N.Y., using a distributed database. However, this arrangement is significantly more complex, and requires more overhead to manage, than needed for the task of storing qtree information.

According to an illustrative embodiment, qtree (or other sub-organization) metadata in a store outside the qtree structures on the volume at a non-distributed namespace in the form of a qtree metadata file. This file is stored at a well-known location on the volume that is readily accessible by the file system. The qtree metadata file generally stores pointers and qtree names that allow the file system to query the file's information, and then using the name and pointer, access a selected qtree anywhere on the volume.

Figure 19:
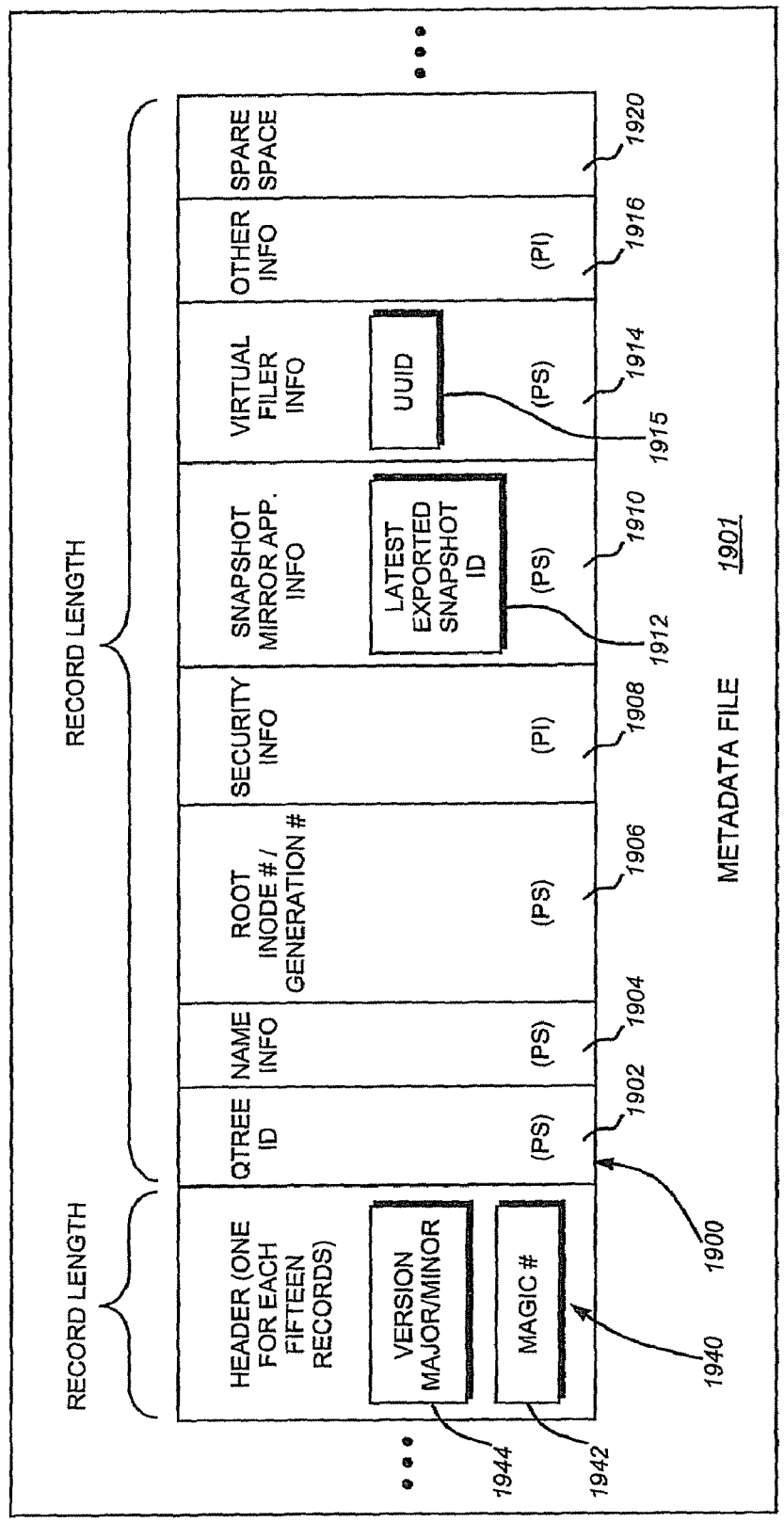
FIG. 19 is a schematic diagram a qtree metadata file and an associated record entry according to an illustrative embodiment.

In an illustrative embodiment, the qtree metadata file includes a set of fixed length records relative to each qtree on the snapshot replica volume. FIG. 19 shows the structure of a fixed length record 1900 in a metadata file 1901 for storing various information related to qtrees (or other sub-organizations). In this example, the record is 256 bytes wide. However the size of the record can be varied. In general, because the records are fixed length, a length indicator is not needed in the record itself. The metadata file contains a succession of record entries, like that illustrated in FIG. 19, for every respective qtree structure in the destination volume (and only that volume). Note, when a snapshot of the destination is exported, the qtree metadata file is not included because the file is independent of the qtree.

The above-described, well-known location for storage of the metadata file 1901 can be a reserved inode, a predetermined sector of the disk, or another locatable structure.

One possible, well-known and advantageous location for the metadata file is as part of a metadata directory (or "metadir"), which is an unrooted namespace within the volume that is know by the file system, but is generally inaccessible to users. The metadir has a root inode, pointing to, among other structures, the metadata file. This metadir is described in detail in commonly assigned U.S. patent application Ser. No. 10/191,705, now issued as U.S. Pat. No. 7,386,546, entitled METADATA DIRECTORY FILE SYSTEM, by Douglas Santry, the teachings of which are expressly incorporated herein by reference.

The fixed length record entry 1900 includes a plurality of predetermined fields. The fields laid out in an arbitrary order, subject to variation. There is a qtree ID 1902 that identifies the associated qtree. Name information 1904 is a "short" name can be used to reference the full name of the qtree. It is a pointer to a directory entry containing the actual qtree name. In one implementation the actual name is a variable length Unicode string or any other legal directory name in a naming scheme such as CIFS. The actual name of the qtree may be stored on the tree itself, and may be reasonably long (e.g. 1 KB). The actual name may be used for administrative reasons among others. In particular the pointer embodied in the name enables a qtree to be placed anywhere on the volume. There are an associated root inode number and a generation number 1906 for the qtree. This allows location of the root. Relevant security information 1908 (also commonly termed "security style") that relates specifically to well-known file system security policies. For example, the qtree may be treated as a particular well-known NTFS security style or a Unix security style, etc. The record 1900 also contains specific snapshot mirror application information 1910. This is information needed by the application to perform various qtree-specific tasks and function. Significantly, the information 1910 includes the latest exported snapshot ID 1912 used for redirection, as described above. There can also be virtual filer information 1914, such as the identity (UUID etc.) of an owning virtual filer (1915)—which can be one of a plurality of virtual filers established within an overall physical filer environment. Also included is various other information 1916 that can be in a fixed location, or plurality of locations throughout the entry 1900. Finally, there is an empty "spare" space area 1920 in the entry that is available for expansion due to software updates (new versions), bug fixes and the like.

In an illustrative embodiment, the metadata file 1901 resides on a group of 4 KB blocks. Each block consists of a string of fifteen fixed-length qtree records (1900) and a header record (also 256 bytes in length) 1940. Within the header is a magic number 1942 to identify the 4 KB file block as belonging to the particular qtree metadata file. There is a version number 1944 that includes the major version (e.g. a product release number) and a minor version (e.g. a maintenance release number). The version number can be incorporated at a variety of locations within the entry file. These numbers are useful in software update procedures described further below.

In an illustrative embodiment, each of the fields in the metadata file are categorized as either "performance-sensitive" (denoted PS in FIG. 19) or "performance-insensitive" (denoted PI). All performance-sensitive fields—those that are needed frequently for fast lookup, or that may slow processing if they are not readily available incore—are loaded into the file server buffer cache upon boot up. Where a volume may contain many qtrees, the appropriate qtree metadata file may, alternatively, be loaded the first time the qtree is referenced by the file system. This saves time at boot up, avoiding loading of seldom-used qtree state information. Conversely, the performance-insensitive fields are loaded into the buffer cache only when needed to perform a specific operation. In the illustrative embodiment, the performance-sensitive (PS) information includes the qtree ID 1902, name 1904, root inode and generation number 1906, latest exported snapshot 1912, owning virtual filer name (1914), and other miscellaneous flags (not shown). Other information is presumed to be performance-insensitive (PI) in this embodiment.

As discussed generally above, the illustrative file server environment (FIG. 3) includes NVRAM backup for disaster recovery. Simply stated, the NVRAM 335 includes an NVLOG 380 that stores and continually updates file system requests and other necessary information that pass through the buffer cache. The NVLOG data is periodically committed to disk storage as part of a consistency point operation, and the appropriate part of the log is flushed. In the event of disaster, the log retains any information accumulated since the last consistency point (from when it was last flushed). This information is replayed into the buffer cache by the file system at the appropriate time, and acted upon to ensure continuity of file service. A general description of an NVLOG, consistency points and log replay can be found in commonly assigned U.S. Pat. No. 7,249,150, issued on Jul. 24, 2007, entitled SYSTEM AND METHOD FOR PARALLELIZED REPLAY OF AN NVRAM LOG IN A STORAGE APPLIANCE by Steven S. Watanbe, et al., the teachings of which are expressly incorporated herein by reference.

Any changes to the qtree metadata file are committed to the NVLOG as they occur. In the event of a failure, the replay mechanism within the file system also replays the qtree metadata file information back into the buffer cache. More specifically, the process of qtree creation automatically initializes the corresponding record in the qtree metadata file. The initialization of qtrees is part of the information automatically replayed during the NVLOG replay.

Note that, if a qtree moves within a volume, the move operation automatically updates the name and reference information in the qtree as part of the move operation.

One noted advantage of the separately maintained metadata file according to this invention is that it enables easier handling of software upgrades and backward compatibility to older versions of the same software. In other words, in keeping with the spirit of the above-described data stream format, the metadata directory enables one version (major or minor) of the source file system to transmit a data stream of changes, with corresponding version-specific information, to a destination that runs a second, different, version of the file system—in most instances. In particular, the metadata file on the destination is compatible with any different minor release from the source, and is at least backward compatible with earlier major versions of the source.

Figure 20:
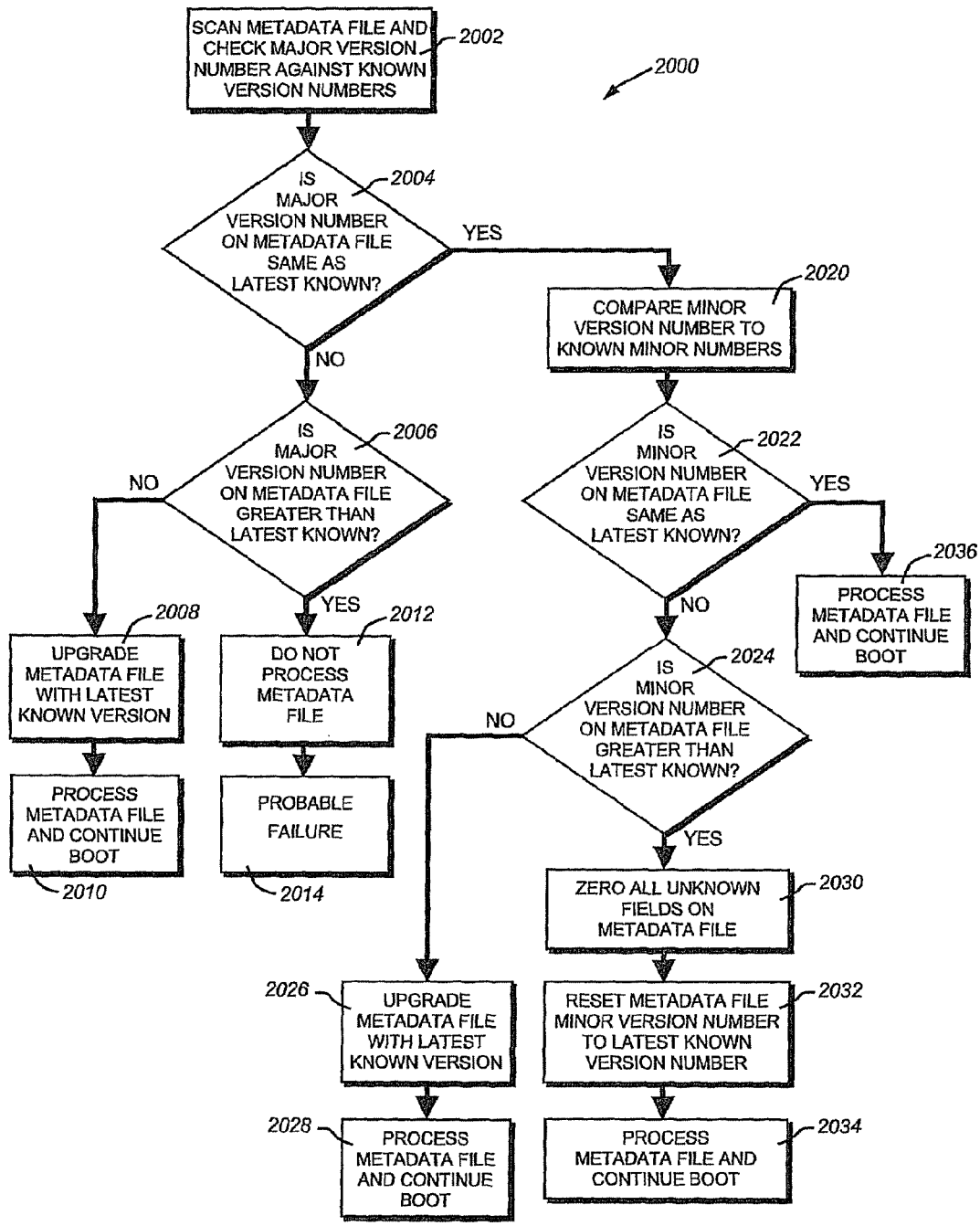
FIG. 20 is a flow diagram of a procedure for comparing and conforming a version of scanned metadata file to a latest known version of the metadata file in the file system.

Referring to FIG. 20, a flow diagram outlining the procedure 2000, by which different versions are compared and conformed. As described above, the qtree metadata file includes a major version and a minor version. These can be expressed, typically as a pair of numbers, incremented upwardly for each new version. For example, "version 3.5" would reference a major version 3 and minor version 5. A new major version would be, for example, "4.0" (with the minor version number reset to zero (0)), and "3.6" would represent a new minor version.

According to step 2002 of the procedure 2000, at bootup (or at another critical stage), the file system kernel scans the metadata file, checking the major and minor version numbers against versions it has recorded (i.e. "knows"). If the major version number is not the same as the latest known version (decision step 2004), then the procedure determines whether the major version number is greater or less than the latest known major version number (decision step 2006). Note that the latest known version (most-up-to-date) in this example is the highest major number, and within that highest major number, the highest minor number. If the metadata file version number is less than the latest known version, then the file is out of date, and the kernel proceeds to update the file (step 2008) to the latest known version (latest major/minor). The metadata file is then processed by the kernel in a normal manner and boot continues (step 2010).

If the scanned major version number for the metadata file is less than the minor version number, then the kernel is aware that it is dealing with a format that is more recent (newer) than it understands, and the file is not processed (step 2012)—or another corrective state ensues. The probable result is that the volume will not mount due to failure to read and process the qtree metadata file (step 2014).

If the major versions match, then decision step 2004 branches to step 2020 in which the minor version of the qtree metadata file is compared to the latest known minor version. Again, if the file's minor version number is not the same as the latest known (decision step 2022) and the file's minor version is less than the latest known version number (decision step 2024), then the kernel simply upgrades the file to the latest known minor version (step 2026). The kernel then processes the file normally and boot continues according to step 2028.

Conversely, if the procedure 2000 determines (via decision step 2024) that the minor version of the qtree metadata file is greater than the latest known version, then the kernel "zeroes" all fields (or sets them to another non-informational state) in the file's records except for those understood and known by the kernel (step 2030). The minor version number in the file is then reset to the latest known version number (step 2032). The qtree metadata file is then processed normally by the kernel and boot continues. As such, the file automatically reverts to a version fully understood by the kernel, and zeroed fields are treated, in essence, as part of each record's spare space.

Note that, in this example, the file format can be changed without altering the major version number, and only by incrementing the minor version number, if the fields being added in the new version can fit into the existing record and if the file can be reverted to an earlier version simply by zeroing the new fields.

Finally, in the procedure 2000, if both the major version number and minor version number are the same in both the qtree metadata file and the latest known version (decision steps 2004 and 2022, respectively), then the file is simply processed, and boot continues (step 2036).

Accordingly, the procedure 2000 described above allows new functionality that needs to associate and maintain new state information (metadata) associated with a qtree (or other sub-organization) to be more easily introduced. Given a set of N releases, each of which may have new functionality to keep track of more qtree-associated state information, the user can freely run any combination of software releases without having to run an explicit revert command to revert the qtree metadata file to an earlier version. In other words, the qtree metadata file is automatically compatible and interoperable across all N releases, even though the information being maintained by the file may differ in all of the releases.

Likewise, the only conditions warranting a major version number change in accordance with the rules of the procedure 2000 is when the meaning or format of an existing field changes (as opposed to adding a new field into the spare space), or there is no more room in the record to add a new field, requiring the record to be enlarged overall to accommodate the new state information.

The foregoing has been a detail description of illustrative embodiments of the invention. Various modifications and additions can be made without departing form the spirit and scope of the invention. For example, the number of interconnected source and/or destination servers depicted can be varied. In fact, the source and destination servers can be the same machine. It is expressly contemplated that a plurality of sources can transfer data to a destination and vice versa. Likewise, the internal architecture of the servers or their respective storage arrays, as well as their network connectivity and protocols, are all highly variable. The operating systems used on various source and destination servers can differ. In addition, it is expressly contemplated that any of the operations and procedures described herein can be implemented using hardware, software comprising a computer-readable medium having program instructions executing on a computer, or a combination of hardware and software.

What is claimed is:

1. A system configured to access information, comprising:
a processor of a destination computer configured to create a first snapshot of a replicated snapshot for export to a client, the first snapshot created in response to receiving updates to the replicated snapshot from a source computer, wherein the first snapshot does not reflect the updates;
the destination computer configured to receive an access request from the client for the replicated snapshot; and
the processor further configured to, in response to the destination computer receiving the access request, redirect the access request to the first snapshot.

2. The system as in claim 1 wherein the replicated snapshot is of a file system structure comprising a sub-organization of a volume structure.

3. The system as in claim 2 wherein the sub-organization comprises a qtree.

4. The system as in claim 1 wherein the processor is further configured to execute a redirection process to provide an indirection to an inode lookup process that causes the inode lookup process to access the first snapshot in response the access request received for the replicated snapshot.

5. The system as in claim 4 wherein the processor is further configured to set a snapshot ID for a file handle of the first snapshot to a particular ID that causes a file system of the destination computer to look up an inode of the first snapshot, determine from the inode an owning qtree, extract the snapshot ID of the first snapshot, and look up the inode based on the snapshot ID of the first snapshot.

6. The system as in claim 5 wherein the processor is further configured to store the snapshot ID of the first snapshot at a metadata file that is located outside of a qtree structure.

7. The system as in claim 5 wherein the processor is further configured to store, in a metadata file, records comprising one or more fields relative to a particular qtree in which the inode is located.

8. A method for accessing information in a computer environment, comprising:
    creating, by a processor of a destination computer, a first snapshot of a replicated snapshot for export to a client, the first snapshot created in response to receiving updates to the replicated snapshot from a source computer, wherein the first snapshot does not reflect the updates;
    receiving, at the destination computer, an access request from the client for the replicated snapshot; and
    in response to the destination computer receiving the access request, redirecting the access request to the first snapshot by the destination computer.

9. The method as in claim 8 further comprising creating the replicated snapshot of a file system structure comprising a sub-organization of a volume structure.

10. The method as in claim 9 further comprising using a qtree as at least part of the sub-organization.

11. The method as in claim 8 further comprising executing at the destination computer a redirection process to provide an indirection to an inode lookup process that causes the inode lookup process to access the first snapshot in response the access request received for the replicated snapshot.

12. The method as in claim 11 further comprising:
    setting a snapshot ID for a file handle of the first snapshot to a particular ID that causes a file system of the destination computer to look up an inode of the first snapshot;
    determining from the inode an owning qtree;
    extracting the snapshot ID of the first snapshot; and
    looking up the inode based on the snapshot ID of the first snapshot.

13. The method as in claim 12 further comprising storing the snapshot ID of the first snapshot at a metadata file that is located outside of a qtree structure.

14. The method as in claim 12 further comprising storing, in a metadata file, records comprising one or more fields relative to a particular qtree in which the inode is located.

15. A computer-readable storage medium stored with executable program instructions for execution by a processor, the computer-readable storage medium comprising:
    program instructions that create, by a processor of a destination computer, a first snapshot of a replicated snapshot for export to a client, the first snapshot created in response to receiving updates to the replicated snapshot from a source computer, wherein the first snapshot does not reflect the updates;
    program instructions that receive, at the destination computer, an access request from the client for the replicated snapshot; and
    program instructions that, in response to the destination computer receiving the access request, redirect the access request to the first snapshot by the destination computer.

16. The computer-readable storage medium as in claim 15 further comprising program instructions that execute a redirection process to provide an indirection to an inode lookup process that causes the inode lookup process to access the first snapshot in response the access request received for the replicated snapshot.

17. The computer-readable storage medium as in claim 16 further comprising:
    program instructions that set a snapshot ID for a file handle of the first snapshot to a particular ID that causes a file system of the destination computer to look up an inode of the first snapshot;
    program instructions that determine from the inode an owning qtree;
    program instructions that extract the snapshot ID of the first snapshot; and
    program instructions that look up the inode based on the snapshot ID of the first snapshot.

18. A system configured to access information in a computer environment, comprising:
    a processor of a destination computer configured to execute a first process, the first process configured to create a first snapshot of a replicated snapshot for export to a client, wherein the first snapshot created in response to receiving updates to the replicated snapshot from a source computer, wherein the first snapshot does not reflect the updates;
    the destination storage system configured to receive an access request from the client for the replicated snapshot; and
    the processor further configured to execute a second process, the second process configured to, in response to the destination computer receiving the access request, redirect the access request to the first snapshot.

19. The system as in claim 18 wherein the processor is further configured to execute an inode lookup process, wherein the redirection process when executed is further configured to provide an indirection to the inode lookup process that causes the inode lookup process to access the first snapshot in response the access request received for the replicated snapshot.

20. The system as in claim 18 wherein the second process when executed is further configured to:
    set a snapshot ID for a file handle of the first snapshot to a particular ID that causes a file system of the destination computer to look up an inode of the first snapshot;
    determine from the inode an owning qtree;
    extract the snapshot ID of the first snapshot; and
    look up the inode based on the snapshot ID of the first snapshot.

* * * * *